United States Patent
Lin

(10) Patent No.: US 11,907,041 B2
(45) Date of Patent: Feb. 20, 2024

(54) APPLICATION PROCESSOR WAKEUP METHOD AND APPARATUS APPLIED TO MOBILE TERMINAL

(71) Applicant: HUAWEI TECHNOLOGIES CO., LTD., Shenzhen (CN)

(72) Inventor: Dawei Lin, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/241,313

(22) Filed: Apr. 27, 2021

(65) Prior Publication Data

US 2021/0255691 A1 Aug. 19, 2021

Related U.S. Application Data

(63) Continuation of application No. PCT/CN2019/115020, filed on Nov. 1, 2019.

(30) Foreign Application Priority Data

Nov. 1, 2018 (CN) .......................... 201811296192.X
Dec. 17, 2018 (CN) .......................... 201811545062.5

(51) Int. Cl.
*G06F 1/32* (2019.01)
*G06F 1/3287* (2019.01)
*G06F 1/3228* (2019.01)
*G06F 1/3234* (2019.01)

(52) U.S. Cl.
CPC .......... *G06F 1/3287* (2013.01); *G06F 1/3228* (2013.01); *G06F 1/3243* (2013.01)

(58) Field of Classification Search
CPC .................................................... G06F 1/3228
See application file for complete search history.

(56) References Cited

U.S. PATENT DOCUMENTS

| | | |
|---|---|---|
| 2008/0212649 A1 | 9/2008 | Jougit |
| 2011/0231684 A1 | 9/2011 | Conrad et al. |
| 2012/0159218 A1* | 6/2012 | Vangala ............... G06F 1/3209 713/323 |
| 2012/0278641 A1 | 11/2012 | Papakipos et al. |
| 2015/0355942 A1 | 12/2015 | Colin et al. |

(Continued)

FOREIGN PATENT DOCUMENTS

| | | |
|---|---|---|
| CN | 1801101 A | 7/2006 |
| CN | 101180861 A | 5/2008 |
| CN | 101216793 A | 7/2008 |

(Continued)

*Primary Examiner* — Stefan Stoynov
(74) *Attorney, Agent, or Firm* — Rimon PC

(57) ABSTRACT

Embodiments of this application disclose an application processor wakeup method and apparatus applied to a mobile terminal. In the method, whether the mobile terminal is in a preset first state is first detected. After it is determined that the mobile terminal is in the preset first state, a to-be-reported instruction that needs to be reported to an application processor and the priority of the to-be-reported instruction are obtained. When the priority of the to-be-reported instruction is higher than a preset priority, the to-be-reported instruction is reported to the application processor, to wake up the application processor, so that the application processor performs a corresponding operation.

18 Claims, 9 Drawing Sheets

(56) References Cited

U.S. PATENT DOCUMENTS

2017/0078961 A1  3/2017  Rabii et al.

FOREIGN PATENT DOCUMENTS

| | | |
|---|---|---|
| CN | 101449227 A | 6/2009 |
| CN | 101505332 A | 8/2009 |
| CN | 102081574 A | 6/2011 |
| CN | 102577528 A | 7/2012 |
| CN | 103313296 A | 9/2013 |
| CN | 103828446 A | 5/2014 |
| CN | 103947254 A | 7/2014 |
| CN | 104808766 A | 7/2015 |
| CN | 104808767 A | 7/2015 |
| CN | 106060907 A | 10/2016 |
| CN | 106663029 A | 5/2017 |
| JP | 2006127361 A | 5/2006 |
| JP | 2013543202 A | 11/2013 |
| JP | 2015138323 A | 7/2015 |
| JP | 2015143968 A | 8/2015 |
| JP | 2015535418 A | 12/2015 |
| JP | 2017174192 A | 9/2017 |
| KR | 20070086567 A | 8/2007 |

\* cited by examiner

APPLICATION PROCESSOR WAKEUP METHOD AND APPARATUS APPLIED TO MOBILE TERMINAL

CROSS-REFERENCE TO RELATED APPLICATIONS

This application is a continuation of International Application No. PCT/CN2019/115020, filed on Nov. 1, 2019, which claims priority to Chinese Patent Application No. 201811296192.X, filed on Nov. 1, 2018, and Chinese Patent Application No. 201811545062.5, filed on Dec. 17, 2018. All of the aforementioned patent applications are hereby incorporated by reference in their entireties.

TECHNICAL FIELD

This application relates to the field of communications technologies, and in particular, to an application processor wakeup method and apparatus applied to a mobile terminal.

BACKGROUND

With development of communications technologies, a mobile terminal has increasingly abundant functions, and plays an important role in the daily life and work of a user.

To extend the battery runtime of the mobile terminal, when no user operation is received for a relatively long time, an application processor in the mobile terminal usually enters a sleep state. In comparison with the application processor in a wakeup state, the application processor in the sleep state consumes less power, thereby reducing power consumption of the mobile terminal and making the runtime of the mobile terminal longer.

However, in a research process of this application, the inventor finds that, after the application processor enters the sleep state, another component (for example, a modem) in the mobile terminal still receives various instructions occasionally and transmits the instructions to the application processor. In such case, the application processor frequently is given instructions and has to perform operations corresponding to the instructions. As a result, the application processor in the sleep state is frequently woken up and enters a high power consumption state again. For example, if network flapping occurs, a serving cell frequently sends a cell handover instruction to the mobile terminal. Each time the terminal device receives the cell handover instruction, the mobile terminal needs to wake up the application processor and the application processor performs a cell handover operation based on the cell handover instruction. Consequently, the application processor is frequently woken up from the sleep state.

SUMMARY

To solve a prior-art problem that an application processor in a sleep state in a mobile terminal is frequently woken up due to frequent reception of instructions, embodiments of this application disclose an application processor wakeup method and apparatus applied to a mobile terminal.

According to a first aspect, an embodiment of this application provides an application processor wakeup method applied to a mobile terminal, including:

detecting whether a mobile terminal is in a preset first state, where the first state is any one or more of the following states of the mobile terminal: a screen-off state, a non-charging state, or a state in which a speed of the mobile terminal is less than a preset first threshold and a serving cell handover speed is less than a preset second threshold;

after it is determined that the mobile terminal is in the preset first state, obtaining a to-be-reported instruction that needs to be reported to an application processor and a priority of the to-be-reported instruction; and when the priority of the to-be-reported instruction is higher than a preset priority, reporting the to-be-reported instruction to the application processor, to wake up the application processor.

In the prior art, each time after the mobile terminal obtains the to-be-reported instruction, the mobile terminal immediately reports the to-be-reported instruction to the application processor. As a result, the application processor frequently receives instructions. As a result, the application processor is frequently woken up. However, in the solution in this embodiment of this application, only when the to-be-reported instruction whose priority is higher than the preset priority is obtained, the to-be-reported instruction is reported to the application processor, to reduce a quantity of times of reporting instructions to the application processor and a quantity of times that the application processor receives instructions, thereby avoiding frequent wakeups of the application processor. In this way, the prior-art problem is resolved.

Further, a quantity of times of waking up the application processor is reduced in this embodiment of this application. In comparison with the prior art, the time in which the application processor is in a sleep state is prolonged. Therefore, the runtime of the mobile terminal can be further extended.

With reference to the first aspect, in a first possible implementation of the first aspect, after the obtaining a to-be-reported instruction that needs to be reported to an application processor and a priority of the to-be-reported instruction, the method further includes:

if a difference between the current time and the latest time at which a to-be-reported instruction is reported to the application processor is greater than a third threshold, reporting the to-be-reported instruction to the application processor, to wake up the application processor.

With reference to the first aspect, in a second possible implementation of the first aspect, the obtaining a to-be-reported instruction that needs to be reported to an application processor includes:

receiving at least one time update instruction, and recording a receiving time of the time update instruction each time after the time update instruction is received;

when the mobile terminal meets a preset trigger condition, obtaining a time difference between a current time and a receiving time of a target time update instruction, where the target time update instruction is a time update instruction whose receiving time is closest to the current time, and when the mobile terminal is in a screen-on state and/or a charging state, the mobile terminal meets the preset trigger condition; and obtaining a sum of the time difference and a time included in the target time update instruction, and generating a time reporting instruction including the sum, where the time reporting instruction is the to-be-reported instruction.

In the prior art, each time after the mobile terminal receives the time update instruction, the mobile terminal reports the time update instruction to the application processor, to wake up the application processor, and the application processor performs a time update operation.

However, in the solution disclosed in this embodiment of this application, after obtaining the time update instruction, the mobile terminal caches the time update instruction instead of immediately reporting the time update instruction to the application processor. When the mobile terminal meets a preset trigger condition, the mobile terminal generates the corresponding time reporting instruction based on the latest received time update instruction, and uses the time reporting instruction as the to-be-reported instruction. Therefore, in comparison with the prior art, the quantity of times of reporting instructions to the application processor and the quantity of reported instructions are reduced in the solution disclosed in this embodiment of this application, to further reduce the quantity of times of waking up the application processor, thereby avoiding frequent wakeups of the application processor.

With reference to the first aspect, in a third possible implementation of the first aspect, the obtaining a to-be-reported instruction that needs to be reported to an application processor includes:

after a measurement request delivered by a serving cell is received, measuring channel quality of a first target cell, and reporting the channel quality of the first target cell to the serving cell, where the first target cell is a cell whose cell priority is not lower than a preset first priority threshold; and obtaining a cell handover instruction that is generated by the serving cell based on a preset cell handover rule and the channel quality of the first target cell, where the cell handover instruction is the to-be-reported instruction.

In the prior art, after receiving the measurement request delivered by the serving cell, the mobile terminal measures channel quality of each cell. However, in this embodiment, only the channel quality of the cell whose cell priority is not lower than the preset first priority threshold is measured, thereby reducing a workload of the mobile terminal in measuring the channel quality and improving efficiency in measuring the channel quality.

With reference to the first aspect, in a fourth possible implementation of the first aspect, the obtaining a to-be-reported instruction that needs to be reported to an application processor includes:

after a measurement request delivered by a serving cell is received, measuring channel quality of a first target cell, and reporting the channel quality of the first target cell to the serving cell, where the first target cell is a cell whose cell priority is not lower than a preset first priority threshold;

obtaining a cell handover instruction that is generated by the serving cell based on a preset cell handover rule and the channel quality of the first target cell, and caching the cell handover instruction;

determining a cache time of the cell handover instruction based on the duration in which the mobile terminal is in the first state and the following formula:

In the prior art, after receiving the cell handover instruction, the mobile terminal immediately reports the cell handover instruction to the application processor. However, in this embodiment of this application, after obtaining the cell handover instruction, the mobile terminal caches the cell handover instruction, and after the cache time, uses, as the to-be-reported instruction, the cell handover instruction whose obtaining time is the latest in all the cached cell handover instructions. Therefore, in comparison with the prior art, a quantity of times of reporting cell handover instructions can be reduced in the solution disclosed in this embodiment of this application, thereby reducing the quantity of times of waking up the application processor and avoiding frequent wakeups of the application processor.

With reference to the first aspect, in a fifth possible implementation of the first aspect, the obtaining a to-be-reported instruction that needs to be reported to an application processor includes:

when it is detected that the mobile terminal is in a network idle state, measuring channel quality of a second target cell, where the second target cell is a cell whose cell priority is not lower than a preset second priority threshold; and when it is determined based on the channel quality of the second target cell and a preset cell reselection rule that cell reselection needs to be performed, generating a cell reselection instruction, where the cell reselection instruction is the to-be-reported instruction.

In the prior art, when it is detected that the mobile terminal is in the network idle state, channel quality of each cell is measured. However, in this embodiment, only the channel quality of the cell whose cell priority is not lower than the preset second priority threshold is measured, thereby reducing a workload in measuring the channel quality and improving efficiency in measuring the channel quality. With reference to the first aspect, in a sixth possible implementation of the first aspect, the obtaining a to-be-reported instruction that needs to be reported to an application processor includes:

when it is detected that the mobile terminal is in a network idle state, measuring channel quality of a second target cell, where the second target cell is a cell whose cell priority is not lower than a preset second priority threshold;

when it is determined based on the channel quality of the second target cell and a preset cell reselection rule that cell reselection needs to be performed, generating a cell reselection instruction;

determining a cache time of the cell reselection instruction based on the duration in which the mobile terminal is in the first state and the following formula:

$$T1(t0) = \begin{cases} T11; & t0 < T1 \\ t1*\alpha + T11; & T1 \le t0 \le T2, \\ t1 + T11; & t0 > T2 \end{cases}$$

where

T1(t0) represents the cache time of the cell handover instruction, t0 represents the duration in which the mobile terminal is in the first state, T1, T2, T11, and t1 represent preset duration, and $\alpha$ is a preset constant, where a value of $\alpha$ is a positive number less than 1; and after the cache time is reached, determining, as the to-be-reported instruction, a cell handover instruction whose obtaining time is the latest in at least one cached cell handover instruction.

$$T2(t0) = \begin{cases} T12; & t0 < T3 \\ t2*\beta + T12; & T3 \le t0 \le T4, \\ t2 + T12; & t0 > T4 \end{cases}$$

where

T2(t0) represents the cache time of the cell reselection instruction, t0 represents the duration in which the mobile terminal is in the first state, T3, T4, T12, and t2 represent preset duration, and $\beta$ is a preset constant, where a value of $\beta$ is a positive number less than 1; and after the cache time is reached, determining, as the to-be-reported instruction, a cell handover instruction whose obtaining time is the latest in at least one cached cell reselection instruction.

In the prior art, after obtaining the cell reselection instruction, the mobile terminal immediately reports the cell reselection instruction to the application processor. However, in this embodiment of this application, after obtaining the cell reselection instruction, the mobile terminal caches the cell reselection instruction, and after the cache time is reached, uses, as the to-be-reported instruction, the cell reselection instruction whose obtaining time is the latest in all the cached cell reselection instructions. Therefore, in comparison with the prior art, a quantity of times of reporting cell reselection instructions can be reduced in the solution disclosed in this embodiment of this application, thereby reducing the quantity of times of waking up the application processor and avoiding frequent wakeups of the application processor.

With reference to the first aspect, in a seventh possible implementation of the first aspect, the to-be-reported instruction is an instruction that is obtained for a quantity of times in a target time period that is greater than a preset quantity of times.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation of the first aspect, after the obtaining a to-be-reported instruction that needs to be reported to an application processor, the method further includes:

determining the third threshold based on the duration in which the mobile terminal is in the first state and the following formula:

$$T3(t0) = \begin{cases} T13; & t0 < T5 \\ t3 * \delta + T13; & T5 \leq t0 \leq T6, \\ t3 + T13; & t0 > T6 \end{cases}$$

where $T3(t0)$ represents the third threshold, $t0$ represents the duration in which the mobile terminal is in the first state, $T5$, $T6$, $T13$, and $t3$ represent preset duration, and $\delta$ is a preset constant, where a value of $\delta$ is a positive number less than 1.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation of the first aspect, the reporting the to-be-reported instruction to the application processor further includes:

when there are more than two to-be-reported instructions of a same type, comparing the obtaining times of the to-be-reported instructions of the same type; and reporting, to the application processor, a to-be-reported instruction whose obtaining time is the latest in the to-be-reported instructions of the same type.

Before the to-be-reported instructions are reported to the application processor, the to-be-reported instructions are divided based on types of the to-be-reported instructions. To-be-reported instructions of a same type are grouped into a same group. In this case, only a to-be-reported instruction that is the latest obtained in the to-be-reported instructions in each type needs to be reported to the application processor, thereby reducing a quantity of instructions to be reported to the application processor. In this case, after the application processor is woken up, the application processor needs to execute only the to-be-reported instruction that is the latest obtained in each group of to-be-reported instructions, thereby reducing operations to be performed by the application processor.

According to a second aspect, an embodiment of this application provides an application processor wakeup apparatus applied to a mobile terminal, including:

a state detection module, configured to detect whether a mobile terminal is in a preset first state, where the first state is any one or more of the following states of the mobile terminal: a screen-off state, a non-charging state, or a state in which a speed of the mobile terminal is less than a preset first threshold and a serving cell handover speed is less than a preset second threshold;

an obtaining module, configured to, after it is determined that the mobile terminal is in the preset first state, obtain a to-be-reported instruction that needs to be reported to an application processor and a priority of the to-be-reported instruction; and an instruction reporting module, configured to, when the priority of the to-be-reported instruction is higher than a preset priority, report the to-be-reported instruction to the application processor, to wake up the application processor.

With reference to the second aspect, in a first possible implementation of the first aspect, the instruction reporting module is further configured to, after the to-be-reported instruction that needs to be reported to the application processor and the priority of the to-be-reported instruction are obtained, if a difference between the current time and the latest time when a to-be-reported instruction is reported to the application processor is greater than a third threshold, report the to-be-reported instruction to the application processor, to wake up the application processor.

With reference to the second aspect, in a second possible implementation of the first aspect, the obtaining module includes:

an instruction receiving unit, configured to: receive at least one time update instruction, and record a receiving time of the time update instruction each time after the time update instruction is received;

a time difference obtaining unit, configured to: when the mobile terminal meets a preset trigger condition, obtain a time difference between a current time and a receiving time of a target time update instruction, where the target time update instruction is a time update instruction whose receiving time is closest to the current time, and when the mobile terminal is in a screen-on state and/or a charging state, the mobile terminal meets the preset trigger condition; and a time reporting instruction obtaining unit, configured to: obtain a sum of the time difference and a time included in the target time update instruction, and generate a time reporting instruction including the sum, where the time reporting instruction is the to-be-reported instruction.

With reference to the second aspect, in a third possible implementation of the first aspect, the obtaining module includes:

a first measurement unit, configured to: after a measurement request delivered by a serving cell is received, measure channel quality of a first target cell, and report the channel quality of the first target cell to the serving cell, where the first target cell is a cell whose cell priority is not lower than a preset first priority threshold; and a first instruction obtaining unit, configured to obtain a cell handover instruction that is generated by the serving cell based on a preset cell handover rule and the channel quality of the first target cell, where the cell handover instruction is the to-be-reported instruction.

With reference to the second aspect, in a fourth possible implementation of the first aspect, the obtaining module includes:

a second measurement unit, configured to: after a measurement request delivered by a serving cell is received, measure channel quality of a first target cell, and report the channel quality of the first target cell to the serving cell, where the first target cell is a cell whose cell priority is not lower than a preset first priority threshold;

a first instruction cache unit, configured to: obtain a cell handover instruction that is generated by the serving cell based on a preset cell handover rule and the channel quality of the first target cell, and cache the cell handover instruction;

a first cache time determining unit, configured to determine a cache time of the cell handover instruction based on a duration in which the mobile terminal is in the first state and the following formula:

$$T1(t0) = \begin{cases} T11; & t0 < T1 \\ t1*\alpha + T11; & T1 \le t0 \le T2 \\ t1 + T11; & t0 > T2 \end{cases},$$

where

T1 (t0) represents the cache time of the cell handover instruction, t0 represents the duration in which the mobile terminal is in the first state, T1, T2, T11, and t1 represent preset duration, and $\alpha$ is a preset constant, where a value of $\alpha$ is a positive number less than 1; and a first instruction determining unit, configured to: after the cache time is reached, determine, as the to-be-reported instruction, a cell handover instruction whose obtaining time is the latest in at least one cached cell handover instruction.

With reference to the second aspect, in a fifth possible implementation of the first aspect, the obtaining module includes:

a third measurement unit, configured to: when it is detected that the mobile terminal is in a network idle state, measure channel quality of a second target cell, where the second target cell is a cell whose cell priority is not lower than a preset second priority threshold; and a first instruction generating unit, configured to: when it is determined based on the channel quality of the second target cell and a preset cell reselection rule that cell reselection needs to be performed, generate a cell reselection instruction, where the cell reselection instruction is the to-be-reported instruction.

With reference to the second aspect, in a sixth possible implementation of the first aspect, the obtaining module includes:

a fourth measurement unit, configured to: when it is detected that the mobile terminal is in a network idle state, measure channel quality of a second target cell, where the second target cell is a cell whose cell priority is not lower than a preset second priority threshold;

a second instruction generating unit, configured to: when it is determined based on the channel quality of the second target cell and a preset cell reselection rule that cell reselection needs to be performed, generate a cell reselection instruction;

a second cache time determining unit, configured to determine a cache time of the cell reselection instruction based on the duration in which the mobile terminal is in the first state and the following formula:

$$T2(t0) = \begin{cases} T12; & t0 < T3 \\ t2*\beta + T12; & T3 \le t0 \le T4 \\ t2 + T12; & t0 > T4 \end{cases},$$

where

T2(t0) represents the cache time of the cell reselection instruction, t0 represents the duration in which the mobile terminal is in the first state, T3, T4, T12, and t2 represent preset duration, and $\beta$ is a preset constant, where a value of $\beta$ is a positive number less than 1; and a second instruction determining unit, configured to: after the cache time is reached, determine, as the to-be-reported instruction, a cell handover instruction whose obtaining time is the latest in at least one cached cell reselection instruction.

With reference to the second aspect, in a seventh possible implementation of the first aspect, the to-be-reported instruction is an instruction that is obtained for a quantity of times in a target time period that is greater than a preset quantity of times.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation of the second aspect, the apparatus further includes:

a third threshold determining module.

The third threshold determining module is configured to: after the to-be-reported instruction that needs to be reported to the application processor is obtained, determine the third threshold based on the duration in which the mobile terminal is in the first state and the following formula:

$$T3(t0) = \begin{cases} T13; & t0 < T5 \\ t3*\delta + T13; & T5 \le t0 \le T6 \\ t3 + T13; & t0 > T6 \end{cases},$$

where

T3(t0) represents the third threshold, t0 represents the duration in which the mobile terminal is in the first state, T5, T6, T13, and t3 represent preset duration, and $\delta$ is a preset constant, where a value of $\delta$ is a positive number less than 1.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, or the eighth possible implementation of the second aspect, in a ninth possible implementation of the second aspect, the instruction reporting module includes:

a time comparison unit, configured to: when there are more than two to-be-reported instructions of a same type, compare the obtaining times of the to-be-reported instructions of the same type; and an instruction reporting unit, configured to report, to the application processor, a to-be-reported instruction whose obtaining time is the latest in the to-be-reported instructions of the same type.

According to a third aspect, an embodiment of this application provides a mobile terminal, including:

a memory, a processor, and a computer program that is stored in the memory and that can be run on the processor, where the processor executes the computer program to implement the method according to the first aspect.

According to a fourth aspect, a computer-readable storage medium including an instruction is provided. When the instruction is run on a computer, the computer is enabled to perform the method according to the first aspect.

The embodiments of this application disclose the application processor wakeup method and apparatus applied to the mobile terminal. In the method, whether the mobile terminal is in the preset first state is first detected. After it is determined that the mobile terminal is in the preset first state, the to-be-reported instruction is obtained, and the priority of the to-be-reported instruction is obtained. When the to-be-reported instruction whose priority is higher than the preset priority, the to-be-reported instruction is reported to the application processor, to wake up the application processor, so that the application processor performs a corresponding operation.

In the prior art, each time after the mobile terminal obtains the to-be-reported instruction, the mobile terminal immediately reports the to-be-reported instruction to the application processor. In this case, the application processor frequently obtains instructions. As a result, the application processor is frequently woken up. However, in the solutions in the embodiments of this application, only when the to-be-reported instruction whose priority is higher than the preset priority is obtained, the to-be-reported instruction is reported to the application processor, to reduce a quantity of times of reporting instructions to the application processor and further reduce a quantity of times that the application processor receives instructions, thereby avoiding frequent wakeups of the application processor. In this way, the prior-art problem is resolved.

Further, a quantity of times of waking up the application processor is reduced in the embodiments of this application. In comparison with the prior art, the time in which the application processor stays in a sleep state is prolonged. Therefore, the runtime of the mobile terminal can be further extended.

BRIEF DESCRIPTION OF DRAWINGS

To describe the technical solutions in this application more clearly, the following briefly describes the accompanying drawings required for describing the embodiments. It is clear that a person of ordinary skill in the art may further derive other drawings from these accompanying drawings without creative efforts.

DESCRIPTION OF EMBODIMENTS

To solve a prior-art problem that an application processor in a sleep state in a mobile terminal is frequently woken up due to frequently receiving of instructions, the embodiments of this application disclose an application processor wakeup method and apparatus applied to a mobile terminal.

Figure 1:
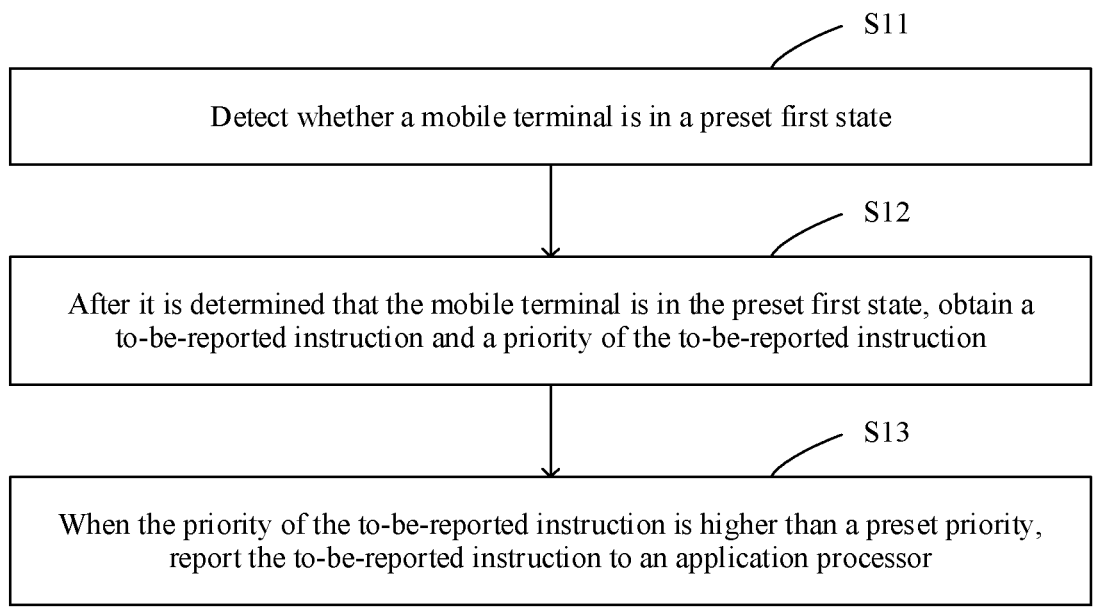
FIG. 1 is a schematic diagram of a work procedure of an application processor wakeup method applied to a mobile terminal according to an embodiment of this application.

With reference to a schematic diagram of a work procedure shown in FIG. 1, an application processor wakeup method applied to a mobile terminal disclosed in an embodiment of this application includes the following steps:

Step S11: Detect whether a mobile terminal is in a preset first state.

The first state is any one or more of the following states of the mobile terminal: a screen-off state, a non-charging state, or a state in which a speed of the mobile terminal is less than a preset first threshold and a serving cell handover speed is less than a preset second threshold.

In this embodiment of this application, the first state is preset. When the mobile terminal is in the first state, the application processor wakeup method applied to a mobile terminal disclosed in this embodiment of this application is performed, to reduce a quantity of times of waking up an application processor.

The first state is any combination of one or more of the following states: the screen-off state, the non-charging state, or the state in which the speed is less than the preset first threshold and the serving cell handover speed is less than the preset second threshold. For example, in an implementation, it may be set that the mobile terminal is in the first state when the mobile terminal is in the screen-off state, the non-charging state, and the state in which the speed of the mobile terminal is less than the preset first threshold and the serving cell handover speed is less than the preset second threshold. The mobile terminal in this state indicates that the mobile terminal is not used by a user currently. In addition, because the mobile terminal is not charged, to reduce power consumption of the mobile terminal, the application processor does not need to be frequently woken up, and instead, the application processor is kept in a sleep state.

Step S12: After it is determined that the mobile terminal is in the preset first state, obtain a to-be-reported instruction that needs to be reported to the application processor and a priority of the to-be-reported instruction.

The mobile terminal can obtain a plurality of types of instructions. For example, after the mobile terminal sets up a network connection, each cell delivers a time update instruction to the mobile terminal. A time is carried in the time update instruction, so that the mobile terminal updates a time of the mobile terminal. In addition, the mobile terminal can further receive a cell handover instruction delivered by a serving cell, and the like. In this embodiment of this application, the corresponding to-be-reported instruction can be obtained on this basis.

In addition, the mobile terminal can further obtain another type of instruction. In this embodiment of this application, the instruction may also be used as the to-be-reported instruction.

For example, sometimes, a network error occurs in the serving cell or a neighboring cell. In this case, an acknowledgment return instruction is frequently delivered to the mobile terminal. After receiving the acknowledgment return instruction, the application processor in the mobile terminal generates corresponding acknowledgment feedback information, and then transmits the acknowledgment feedback information to the serving cell or the neighboring cell. In addition, when the mobile terminal performs data transmission with the serving cell, the mobile terminal needs to set up a data link with the serving cell, to perform the data transmission by using the data link. However, in some cases, for example, due to a relatively weak network signal of the serving cell, setup of the data link fails, and the serving cell delivers a link setup failure instruction to the mobile terminal. In addition, after determining the serving cell, the mobile terminal usually needs to register with the serving cell. However, in some cases, a registration request of the mobile terminal cannot be transmitted to the serving cell, or registration acknowledgment information delivered by the serving cell cannot be transmitted to the mobile terminal, which causes a registration failure of the mobile terminal. In this case, the mobile terminal generates a network registration failure instruction. The acknowledgment return instruction, the link setup failure instruction, and the network registration failure instruction usually need to be reported to the application processor, so that the application processor performs corresponding operations. In this case, in this embodiment of this application, the acknowledgment return instruction, the link setup failure instruction, and the network registration failure instruction may be further used as to-be-reported instructions.

In this embodiment of this application, corresponding priorities are preset for different types of to-be-reported instructions. In other words, a correspondence between each type of to-be-reported instruction and each priority is set. In this case, after the to-be-reported instruction is obtained, the priority of the to-be-reported instruction may be determined based on the type of the to-be-reported instruction. A priority corresponding to a to-be-reported instruction that urgently needs to be processed is usually relatively high, and a priority corresponding to a to-be-reported instruction that does not urgently need to be processed is usually relatively low.

The to-be-reported instruction may include a plurality of types of instructions, for example, a time reporting instruction used to enable the mobile terminal to update the time, a cell handover instruction used to perform cell handover, and a cell reselection instruction used to perform cell reselection. In addition, sometimes, a network error occurs in the serving cell or the neighboring cell. In this case, the acknowledgment return instruction is frequently delivered to the mobile terminal. After receiving the acknowledgment return instruction, the application processor in the mobile terminal generates the corresponding acknowledgment feedback information, and then transmits the acknowledgment feedback information to the serving cell, the neighboring cell, or the like. The acknowledgment return instruction is also the to-be-reported instruction. In this case, a table may be preset. The table is used to represent a correspondence between each of different types of to-be-reported instructions and a priority of each instruction. The mobile terminal stores the table. In this way, after obtaining the to-be-reported instruction, the mobile terminal determines the priority of the obtained to-be-reported instruction based on the table.

If a priority of the cell handover instruction is the highest priority, a priority of the cell reselection instruction is lower than that of the cell handover instruction, a priority of the acknowledgment return instruction is lower than that of the cell reselection instruction, and a priority of the time reporting instruction is lower than that of the acknowledgment return instruction, the table may be in the following form:

| Instruction name | Instruction priority |
| --- | --- |
| Cell handover instruction | 1 |
| Cell reselection instruction | 2 |
| Acknowledgment return instruction | 3 |
| Time reporting instruction | 4 |

Certainly, the correspondence between each type of to-be-reported instruction and a priority of each instruction may be alternatively set in another form. This is not limited in this embodiment of this application.

Step S13: When the priority of the to-be-reported instruction is higher than a preset priority, report the to-be-reported instruction to the application processor, to wake up the application processor.

In this embodiment of this application, if the obtained to-be-reported instruction includes the to-be-reported instruction whose priority is higher than the preset priority, it may be considered that a reporting condition is met, so that the to-be-reported instruction is reported to the application processor.

In addition, when the to-be-reported instruction whose priority is higher than the preset priority is obtained, another to-be-reported instruction with a relatively low priority may be further obtained. In this case, the another to-be-reported instruction with the relatively low priority may also be simultaneously reported.

Further, if a plurality of to-be-reported instructions need to be reported to the application processor, a reporting sequence may be determined based on obtaining times of the to-be-reported instructions in this step. In this case, the to-be-reported instructions are sequentially reported according to the sequence of the obtaining times of the to-be-reported instructions. Alternatively, a reporting sequence may be further determined based on priorities of the to-be-reported instructions in this step. In this case, a to-be-reported instruction with a relatively high priority is preferentially reported based on the priorities of the to-be-reported instructions.

This embodiment of this application discloses the application processor wakeup method applied to a mobile terminal. In the method, whether the mobile terminal is in the preset first state is first detected. After it is determined that the mobile terminal is in the preset first state, the to-be-reported instruction that needs to be reported to the application processor and the priority of the to-be-reported instruction are obtained. When the to-be-reported instruction whose priority is higher than the preset priority, the to-be-reported instruction is reported to the application processor, to wake up the application processor, so that the application processor performs a corresponding operation.

In the prior art, each time after the mobile terminal obtains the to-be-reported instruction, the mobile terminal immediately reports the to-be-reported instruction to the application processor. In this case, the application processor frequently obtains instructions. As a result, the application processor is frequently woken up. However, in the solution in this embodiment of this application, only when the to-be-reported instruction whose priority is higher than the preset priority is obtained, the to-be-reported instruction is reported to the application processor, to reduce a quantity of times of reporting instructions to the application processor and further reduce a quantity of times that the application processor obtains instructions, thereby avoiding frequent wakeups of the application processor. In this way, the prior-art problem is resolved.

Further, a quantity of times of waking up the application processor is reduced in this embodiment of this application. In comparison with the prior art, a time in which the application processor is in a sleep state is prolonged. Therefore, the runtime of the mobile terminal can be further extended.

Figure 2:
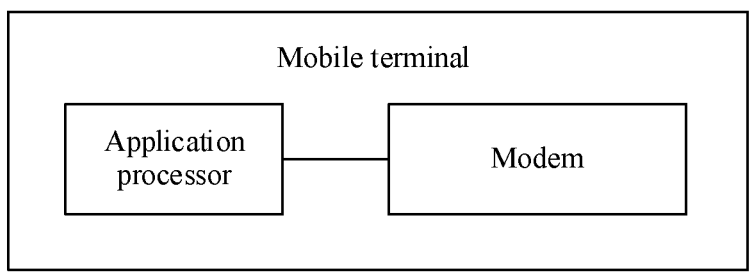
FIG. 2 is a schematic structural diagram of a mobile terminal according to an embodiment of this application.

In the mobile terminal, the application processor is installed, and another component that can perform data transmission with the application processor, for example, a modem is further installed. The method disclosed in this embodiment of this application may be performed by another component in the mobile terminal. For example, the method may be performed by a modem. In this case, when the application processor is in the sleep state, the modem may obtain the to-be-reported instruction, and report the to-be-reported instruction to the application processor when it is determined that the reporting condition is met. In this case, a schematic structural diagram of the mobile terminal is be shown in FIG. 2. With reference to FIG. 2, the application processor and the modem are installed in the mobile terminal. The modem may perform the method disclosed in the embodiments of this application, to obtain the to-be-reported instruction and report the to-be-reported instruction to the application processor.

Certainly, another component disposed in the mobile terminal may alternatively perform the method disclosed in the embodiments of this application. This is not limited in this application.

In addition, in this embodiment of this application, after the to-be-reported instruction that needs to be reported to the application processor and the priority of the to-be-reported instruction are obtained, the method further includes the following step:

If a difference between a current time and a time at which a to-be-reported instruction is reported to the application processor for a latest time is greater than a third threshold, report the to-be-reported instruction to the application processor, to wake up the application processor.

The difference between the current time and the latest time at which the to-be-reported instruction is reported to the application processor is a time between the current time and the time of latest reporting. If the time is greater than the third threshold, the instruction is reported to the application processor by using the foregoing step. In this case, the plurality of to-be-reported instructions that need to be reported include all to-be-reported instructions obtained in the time between the current time and the time of latest reporting.

Figure 3:
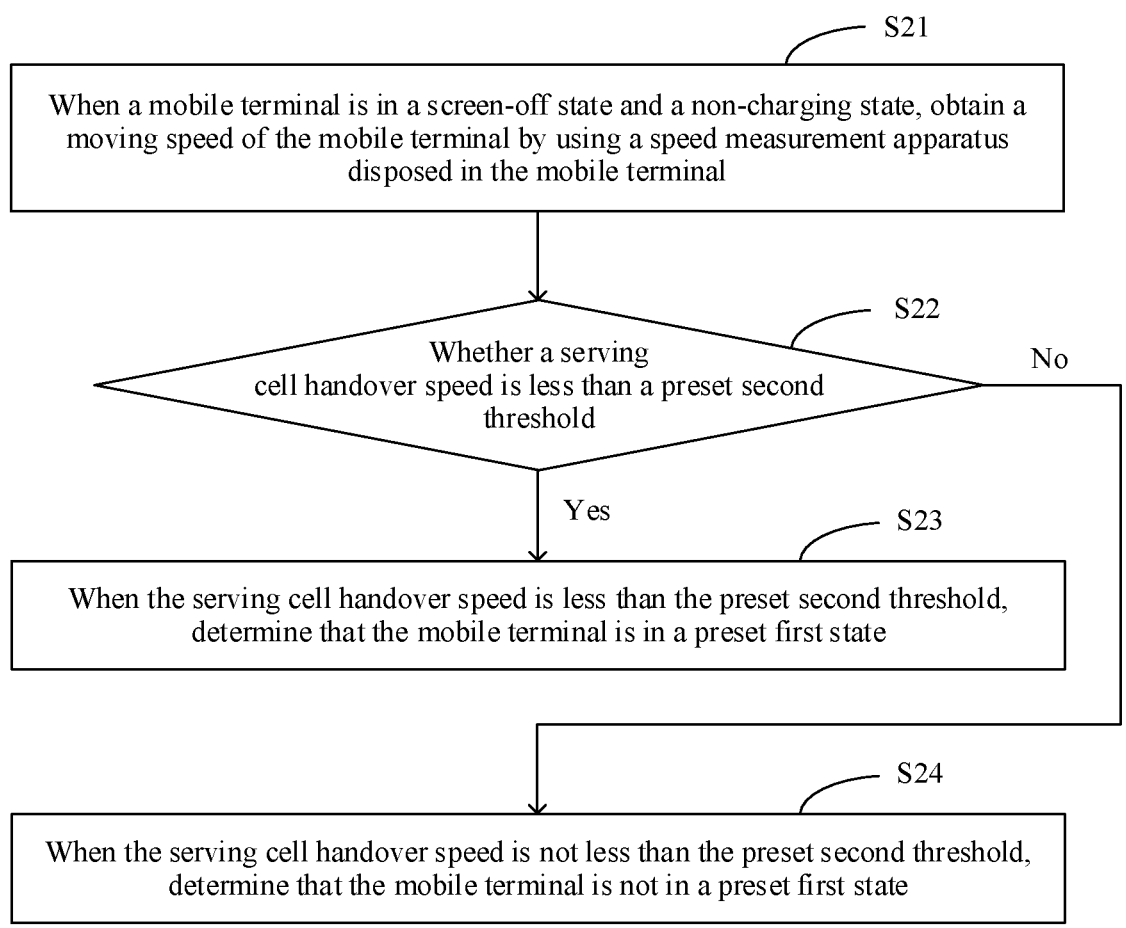
FIG. 3 is a schematic diagram of a work procedure of detecting whether a mobile terminal is in a preset first state in an application processor wakeup method applied to a mobile terminal according to an embodiment of this application.

In addition, in this embodiment of this application, whether the mobile terminal is in the preset first state needs to be detected. The first state is any one or more of the following states of the mobile terminal: the screen-off state, the non-charging state, or the state in which the speed is less than the preset first threshold and the serving cell handover speed is less than the preset second threshold. It is set that the mobile terminal is in the first state when the mobile terminal is in the screen-off state, the non-charging state, and the state in which the speed of the mobile terminal is less than the preset first threshold and the serving cell handover speed is less than the preset second threshold. This application discloses another embodiment as a refinement of the method in FIG. 1 to describe in detail how to detect whether the mobile terminal is in the preset first state. In this embodiment, as shown in FIG. 3, detecting whether the mobile terminal is in the preset first state in step S11 may include the following steps:

Step S21: When the mobile terminal is in the screen-off state and the non-charging state, obtain a moving speed of the mobile terminal.

In this embodiment of this application, a speed measurement apparatus is included in the mobile terminal. The moving speed of the mobile terminal can be determined using the speed measurement apparatus.

The speed measurement apparatus may be an acceleration sensor. Certainly, the speed measurement apparatus may alternatively be another type of apparatus. This is not limited in this embodiment of this application.

Step S22: When the moving speed of the mobile terminal is less than the preset first threshold, detect whether the serving cell handover speed is less than the preset second threshold.

If the serving cell handover speed is less than the preset second threshold, an operation in step S23 is performed; otherwise, an operation in step S24 is performed.

After registering with the serving cell, the mobile terminal can obtain cell information of the serving cell, for example, a cell ID. Different cells can be distinguished based on the cell information. In this case, the serving cell handover speed is usually determined based on a change of the cell information in a unit time. Specifically, the serving cell handover speed is equal to a quantity of serving cells to which the mobile terminal is handed over in the unit time divided by the unit time.

When the moving speed of the mobile terminal is less than the preset first threshold, it indicates that the moving speed of the mobile terminal is relatively low. However, although the moving speed of the mobile terminal is low, the geographical location of the mobile terminal may change rapidly. For example, when a user of the mobile terminal takes a high-speed railway, the geographical location of the mobile terminal changes greatly although the moving speed of the mobile terminal is relatively low. Therefore, whether the mobile terminal is in a static state may be further detected based on the serving cell handover speed.

Step S23: When the serving cell handover speed is less than the preset second threshold, determine that the mobile terminal is in the preset first state.

When the moving speed of the mobile terminal is less than the preset speed threshold, and the serving cell handover speed is less than the preset handover speed threshold, it may be considered that the mobile terminal is in the static state, and it is further determined that the mobile terminal is in the preset first state.

Step S24: When the serving cell handover speed is not less than the preset second threshold, determine that the mobile terminal is not in the preset first state.

If the serving cell handover speed is not less than the preset second threshold, it indicates that the mobile terminal moves in a relatively large geographical range. In this case, it is considered that the mobile terminal is not in the preset first state.

In this embodiment of this application, whether the mobile terminal is in the static state can be determined based on the speed measurement apparatus inside the mobile terminal and the serving cell handover speed, to further detect on this basis whether the mobile terminal is in the preset first state.

In addition, in the prior art, whether the mobile terminal is in the static state is usually determined by using a global positioning system (GPS) embedded in the mobile terminal. However, power consumption of the GPS is relatively high, and the user sometimes disables a GPS function of the mobile terminal. Therefore, whether the mobile terminal is static cannot be determined by using the GPS.

In this embodiment of this application, when whether the mobile terminal is in the static state is detected, whether the mobile terminal is in the static state is determined based on the speed measurement apparatus in the mobile terminal and the serving cell handover speed, instead of the GPS. Therefore, in comparison with the prior art, power consumption of the mobile terminal can be reduced, without considering whether the GPS is disabled.

In addition, an operation of obtaining the to-be-reported instruction is disclosed in this embodiment of this application. The to-be-reported instruction may be obtained in a plurality of manners based on the type of the to-be-reported instruction.

In a manner, the to-be-reported instruction is obtained based on a time update instruction. The serving cell of the mobile terminal usually transmits the time update instruction to the mobile terminal. A time is carried in the time update instruction, so that the mobile terminal updates a time of the mobile terminal based on the time. Generally, after network handover occurs on the mobile terminal, the serving cell transmits the time update instruction to the mobile terminal. For example, it may be learned according to standards in the 3rd generation partnership project (3GPP) protocol that, if the mobile terminal is handed over from a long term evolution (LTE) network to a global system for mobile communications (GSM), a serving cell corresponding to the GSM network transmits a time update instruction to the mobile terminal; and correspondingly, if the mobile terminal is handed over from the GSM network to the LTE network, a serving cell corresponding to the LTE network also transmits a time update instruction to the mobile terminal.

Figure 4:
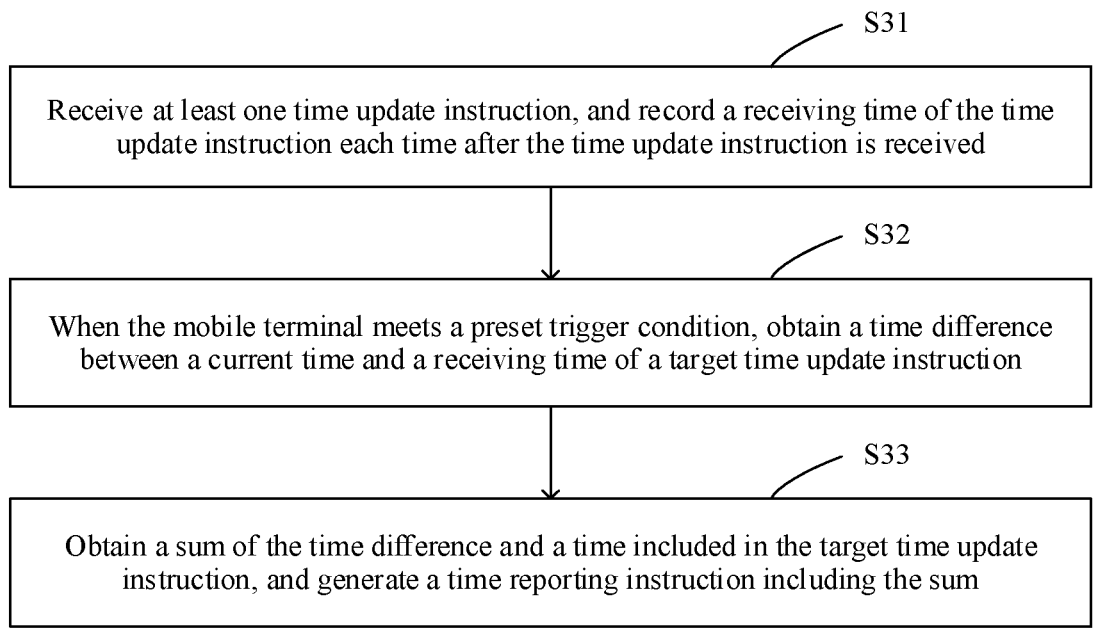
FIG. 4 is a schematic diagram of a work procedure of obtaining a to-be-reported instruction in an application processor wakeup method applied to a mobile terminal according to an embodiment of this application.

In this embodiment of this application, after receiving the time update instruction, the mobile terminal obtains a corresponding time reporting instruction based on the time update instruction, and uses the time reporting instruction as the to-be-reported instruction. In this case, with reference to a schematic diagram of a work procedure shown in FIG. 4, obtaining the to-be-reported instruction that needs to be reported to the application processor includes the following steps:

Step S31: Receive at least one time update instruction, and record a receiving time of the time update instruction each time after the time update instruction is received.

After the mobile terminal establishes the network connection, the serving cell of the mobile terminal and the neighboring cell deliver the time update instruction to the mobile terminal. A time is carried in the time update instruction.

Step S32: When the mobile terminal meets a preset trigger condition, obtain a time difference between a current time and a receiving time of a target time update instruction. The target time update instruction is a time update instruction whose receiving time is closest to the current time.

When the mobile terminal is in a screen-on state and/or a charging state, the mobile terminal meets the preset trigger condition. In other words, when the mobile terminal is in the screen-on state and/or the charging state, it is considered that the mobile terminal meets the preset trigger condition. In this case, the time difference between the current time and the receiving time is then obtained.

A time statistics collection component, for example, a clock register is usually included in the mobile terminal. By using the time statistics collection component, the time difference between the current time and the receiving time of the time update instruction can be obtained. If the time statistics collection component is a clock register, the time difference may be determined based on a crystal oscillator frequency of the clock register. Certainly, for different time statistics collection components, the time difference may also be obtained in another manner. This is not limited in this embodiment of this application.

Step S33: Obtain a sum of the time difference and a time included in the target time update instruction, and generate a time reporting instruction including the sum. The time reporting instruction is the to-be-reported instruction.

The sum of the time difference and the time included in the target time update instruction is a result obtained through adding the time difference and the time included in the target time update instruction. It is set that the time included in the target time update instruction that is transmitted by a cell to the mobile terminal is t0, the time difference between the current time and the receiving time of the target time update instruction is $\Delta t$, and the time included in the generated time reporting instruction is t. In this case, $t=t0+\Delta t$.

Further, after the target time update instruction is determined, another cached time update instruction may be further deleted and be no longer cached, to save storage space.

In the prior art, each time after the mobile terminal receives the time update instruction, the mobile terminal reports the time update instruction to the application processor, to wake up the application processor. In this case, the application processor performs a time update operation.

However, in the solution disclosed in this embodiment of this application, based on the operations in step S31 and step S33, after obtaining the time update instruction, the mobile terminal caches the time update instruction instead of immediately reporting the time update instruction to the application processor. When the mobile terminal meets a preset trigger condition, the mobile terminal generates the corresponding time reporting instruction based on the latest received time update instruction, and uses the time reporting instruction as the to-be-reported instruction. Therefore, in comparison with the prior art, the quantity of times of reporting instructions to the application processor and a quantity of reported instructions are reduced in the solution disclosed in this embodiment of this application, to further reduce the quantity of times of waking up the application processor, thereby avoiding frequent wakeups of the application processor.

Figure 5:
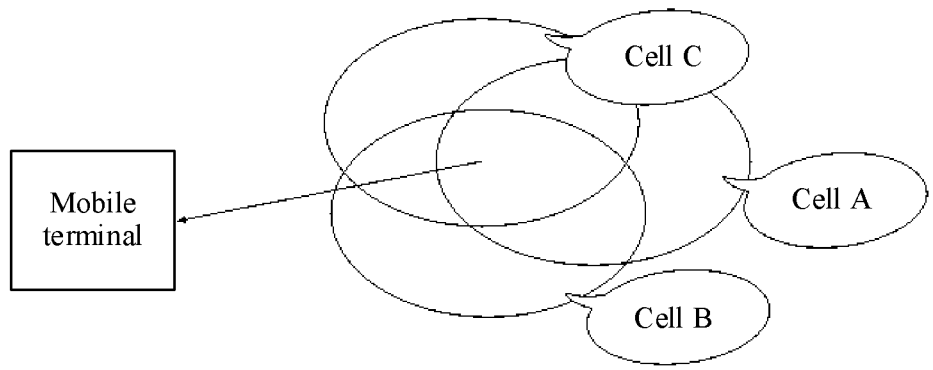
FIG. 5 is a schematic diagram of an application scenario of an application processor wakeup method applied to a mobile terminal according to an embodiment of this application.

Specifically, the mobile terminal is often located at a location of overlapping cells. In other words, there are usually a plurality of cells around the mobile terminal. In this case, cell handover may frequently occur on the mobile terminal, and therefore, a component (for example, a modem) in the mobile terminal frequently receives the time update instruction. For example, with reference to a schematic diagram of an application scenario shown in FIG. 5, the mobile terminal is located in a cell covered by a cell A, a cell B, and a cell C. In this case, due to signal strength fluctuation of each cell, cell handover may frequently occur on the mobile terminal, and therefore, the mobile terminal receives the time update instruction for a plurality of times. In the prior art, each time after the component in the mobile terminal obtains the time update instruction delivered by the cell, the component in the mobile terminal reports the time update instruction to the application processor. Consequently, the application processor is frequently woken up. However, in the solution disclosed in this embodiment of this application, after the time update instruction is received, the time update instruction is cached. When the mobile terminal meets the preset trigger condition, the corresponding time reporting instruction is generated. The time reporting instruction is reported to the application processor. In comparison with the prior art, in the solution in this application, a quantity of times of reporting instructions to the application processor and a quantity of instructions can be greatly reduced, thereby effectively avoiding frequent wakeups of the application processor.

Figure 6:
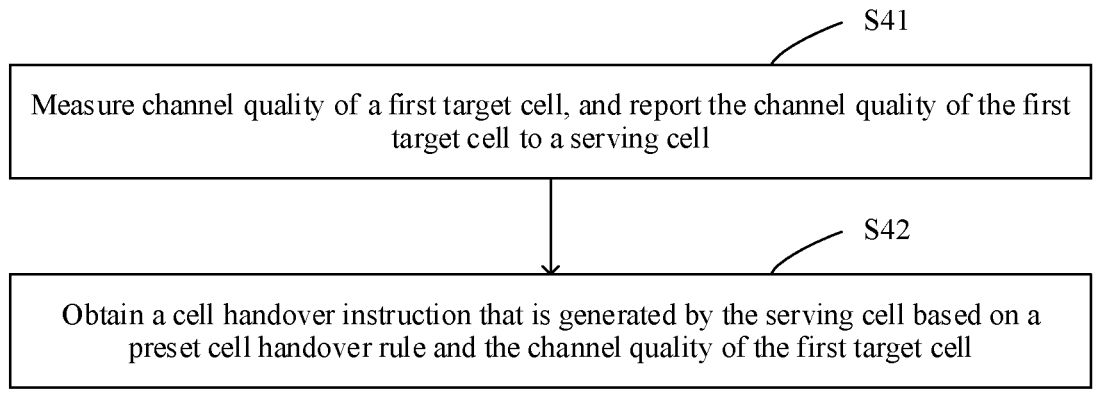
FIG. 6 is a schematic diagram of another work procedure of obtaining a to-be-reported instruction in an application processor wakeup method applied to a mobile terminal according to an embodiment of this application.

In another manner, a corresponding to-be-reported instruction may be further obtained based on a cell handover instruction. In this case, with reference to a schematic diagram of a work procedure shown in FIG. 6, obtaining the to-be-reported instruction that needs to be reported to the application processor includes the following steps:

Step S41: After a measurement request delivered by the serving cell is received, measure channel quality of a first target cell, and report the channel quality of the first target cell to the serving cell. The first target cell is a cell whose cell priority is not lower than a preset first priority threshold.

A network status of the serving cell of the mobile terminal may sometimes change. After the network status of the serving cell changes, the serving cell delivers the measurement request to the mobile terminal, so that the mobile terminal tests channel quality of each surrounding cell (that is, the serving cell and the neighboring cell). In addition, the serving cell can further obtain the priority of each cell, and transmit the priority of each cell to the mobile terminal, so that the mobile terminal can determine the priority of each cell.

In this step, after receiving the measurement request delivered by the serving cell, the mobile terminal uses, as the first target cell, a cell whose cell priority is higher than the first priority threshold, measures the channel quality of the first target cell, and then feeds back the channel quality of the first target cell to the serving cell.

Step S42: Obtain a cell handover instruction that is generated by the serving cell based on a preset cell handover rule and the channel quality of the first target cell. The cell handover instruction is the to-be-reported instruction.

After receiving the channel quality of the first target cell, the serving cell determines, based on the channel quality of the first target cell and the preset cell handover rule, whether the mobile terminal needs to perform cell handover, generates the cell handover instruction when determining that the mobile terminal needs to perform the cell handover, and delivers the cell handover instruction to the mobile terminal, so that the mobile terminal obtains the cell handover instruction. In this step, the cell handover instruction is used as the to-be-reported instruction.

The cell handover rule may be in a plurality of forms. For example, the cell handover rule may be determined based on network signal power of each cell, that is, the mobile terminal is handed over to a cell with relatively high network signal power. Alternatively, the cell handover rule is determined based on a network load of each cell, that is, the mobile terminal is handed over to a cell with a relatively low current network load. Alternatively, the cell handover rule is determined based on a cell priority. In this case, the mobile terminal obtains a priority of each cell and is handed over to a cell with a relatively high priority. Certainly, the cell handover rule may be in another form. This is not limited in this embodiment of this application.

In the prior art, after receiving the measurement request delivered by the serving cell, the mobile terminal measures the channel quality of each cell. However, in the embodiment disclosed in step S41 and step S42, only the channel quality of the cell whose cell priority is not lower than the preset first priority threshold is measured, thereby reducing a workload of the mobile terminal in measuring the channel quality and improving efficiency in measuring the channel quality.

Figure 7:
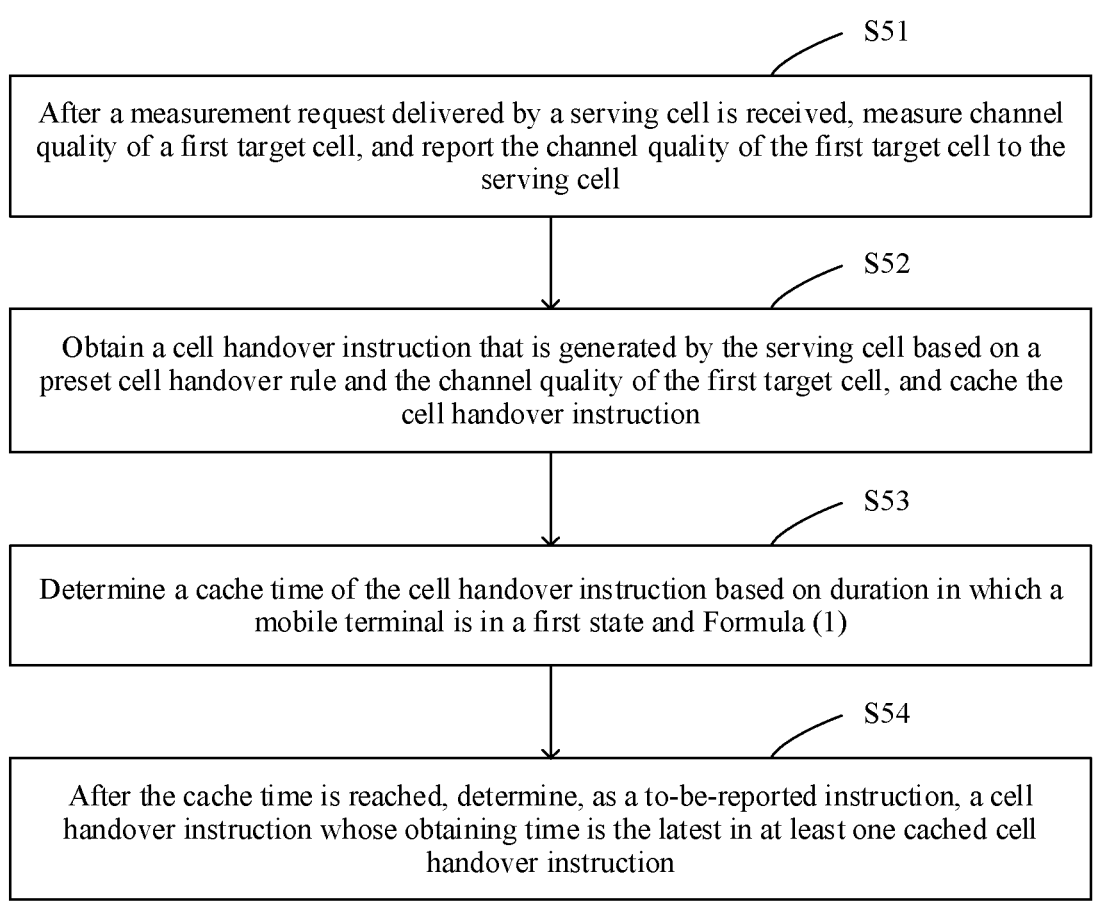
FIG. 7 is a schematic diagram of another work procedure of obtaining a to-be-reported instruction in an application processor wakeup method applied to a mobile terminal according to an embodiment of this application.

Alternatively, in another embodiment of this application, after the cell handover instruction is obtained, the cell handover instruction may be further cached. After the cell handover instruction is cached for a period of time, the to-be-reported instruction is further determined based on the cached cell handover instruction. In this case, with reference to a schematic diagram of a work procedure shown in FIG. 7, obtaining the to-be-reported instruction that needs to be reported to the application processor includes the following steps:

Step S51: After a measurement request delivered by the serving cell is received, measure channel quality of a first target cell, and report the channel quality of the first target cell to the serving cell. The first target cell is a cell whose cell priority is not lower than a preset first priority threshold.

A specific operation process of step S51 is the same as a specific operation process of step S41. Reference may be made between step S51 and step S41. Details are not described herein again.

Step S52: Obtain a cell handover instruction that is generated by the serving cell based on a preset cell handover rule and the channel quality of the first target cell, and cache the cell handover instruction.

Step S53: Determine a cache time of the cell handover instruction based on the duration in which the mobile terminal is in the first state and the following formula:

$$T1(t0) = \begin{cases} T11; & t0 < T1 \\ t1*\alpha + T11; & T1 \le t0 \le T2 \\ t1 + T11; & t0 > T2 \end{cases} \quad \text{Formula (1)}$$

Herein, T1 (t0) represents the cache time of the cell handover instruction, t0 represents the duration in which the mobile terminal is in the first state, T1, T2, T11, and t1 represent preset duration, and $\alpha$ is a preset constant, where a value of $\alpha$ is a positive number less than 1.

Step S54: After the cache time is reached, determine, as the to-be-reported instruction, a cell handover instruction whose obtaining time is the latest in at least one cached cell handover instruction.

In a cache process, the mobile terminal may obtain one or more cell handover instructions. If the mobile terminal receives only one cell handover instruction, the cell handover instruction is a cell handover instruction whose obtaining time is the latest, that is, the cell handover instruction is the to-be-reported instruction. If the mobile terminal receives a plurality of cell handover instructions, the cell handover instruction whose obtaining time is the latest is selected as the to-be-reported instruction.

In the prior art, after receiving the cell handover instruction, the mobile terminal immediately reports the cell handover instruction to the application processor. However, in this embodiment of this application, after obtaining the cell handover instruction, the mobile terminal caches the cell handover instruction, and after the cache time, uses, as the to-be-reported instruction, the cell handover instruction whose obtaining time is the latest in all the cached cell handover instructions. Therefore, in comparison with the prior art, a quantity of times of reporting cell handover instructions can be reduced in the solution disclosed in this embodiment of this application, thereby reducing the quantity of times of waking up the application processor and avoiding frequent wakeups of the application processor.

Further, after the to-be-reported instruction is determined, another cached cell handover instruction may be further deleted and be no longer cached, to save storage space.

The cache time of the cell handover instruction is determined by using Formula (1). In Formula (1), $\alpha$ is a preset constant, and a value of $\alpha$ is usually a positive number less than 1. For example, $\alpha$ may be set to 0.7. In addition, T11 is an initial value of the cache time, and specific duration of T11 may be preset according to an actual application requirement. It can be learned from the formula that, if the duration in which the mobile terminal is in the first state is less than the preset duration T1, the corresponding cache time is T11. In this case, the cache time is equal to the initial value of the cache time. If the duration in which the mobile terminal is in the first state is not less than the preset duration T1 and is not greater than the preset duration T2, the corresponding cache time is t1*$\alpha$+T11. If the duration in which the mobile terminal is in the first state is greater than the preset duration T2, the corresponding cache time is t1+T11.

Figure 8:
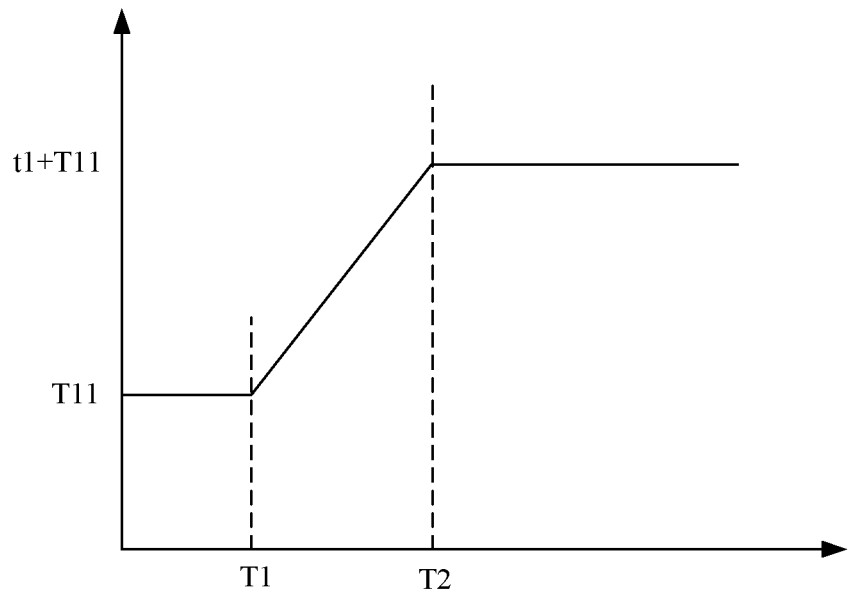
FIG. 8 is a schematic diagram of a correspondence between a cache time of a cell handover instruction and duration in which a mobile terminal is in a first state in an application processor wakeup method applied to a mobile terminal according to an embodiment of this application.

In this case, a correspondence between the cache time of the cell handover instruction and the duration in which the mobile terminal is in the first state may be shown in FIG. 8. In FIG. 8, a horizontal coordinate represents the duration in which the mobile terminal is in the first state, and a vertical coordinate represents the cache time.

It can be learned from the foregoing formula and FIG. 8 that, in this embodiment of this application, the longer duration in which the mobile terminal is in the first state indicates the longer cache time of the cell handover instruction.

Figure 9:
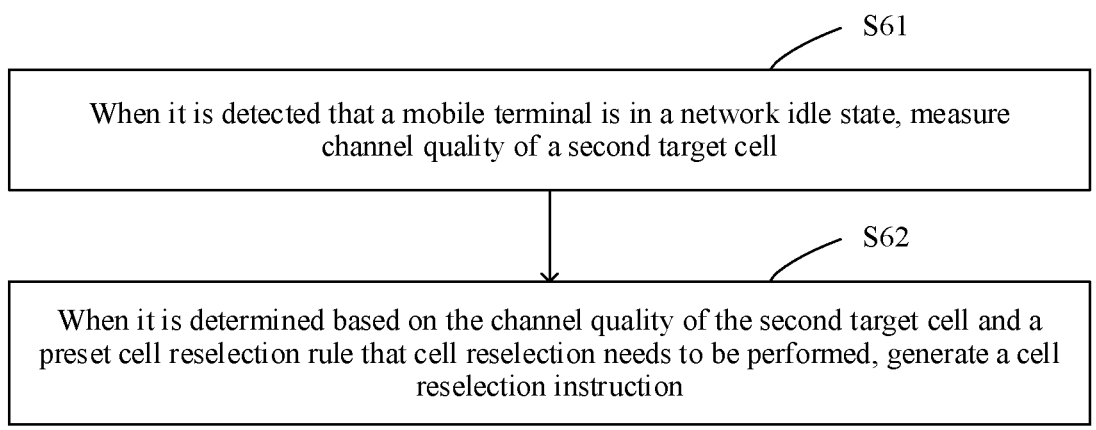
FIG. 9 is a schematic diagram of another work procedure of obtaining a to-be-reported instruction in an application processor wakeup method applied to a mobile terminal according to an embodiment of this application.

In the foregoing embodiment, the to-be-reported instruction is obtained based on the cell handover instruction. In addition, a corresponding to-be-reported instruction may be further obtained based on the cell reselection instruction. In this case, with reference to a schematic diagram of a work procedure shown in FIG. 9, obtaining the to-be-reported instruction that needs to be reported to the application processor includes the following steps:

Step S61: When it is detected that the mobile terminal is in a network idle state, measure channel quality of a second target cell. The second target cell is a cell whose cell priority is not lower than a preset second priority threshold.

If it is detected that the mobile terminal is in the network idle state, the mobile terminal usually actively measures channel quality of each cell, determines based on the measured channel quality whether cell reselection needs to be performed, and generates a corresponding cell reselection instruction when the cell reselection needs to be performed.

In this step, when it is determined that the mobile terminal is in the network idle state, the cell priority of each cell is queried. A cell whose cell priority is higher than the second priority threshold is used as the second target cell. The channel quality of the second target cell is measured.

Step S62: When it is determined based on the channel quality of the second target cell and a preset cell reselection rule that cell reselection needs to be performed, generate a cell reselection instruction. The cell reselection instruction is the to-be-reported instruction.

The cell reselection rule may be in a plurality of forms. For example, the cell reselection rule is determined by a network operator. In this case, it is set that an operator of the serving cell before the mobile terminal performs reselection is a first operator. A cell to be reselected is a cell supported by the first operator. Alternatively, the cell reselection rule is determined based on signal strength of each cell. In this case, it is determined that a cell to be reselected is a cell with strongest signal strength. Currently, the cell reselection rule may be in another form. This is not limited in this embodiment of this application.

In the prior art, when it is detected that the mobile terminal is in the network idle state, the channel quality of each cell is measured. However, in the embodiment disclosed in step S61 and step S62, only the channel quality of the cell whose cell priority is not lower than the preset second priority threshold is measured, thereby reducing a workload in measuring the channel quality and improving efficiency in measuring the channel quality.

Figure 10:
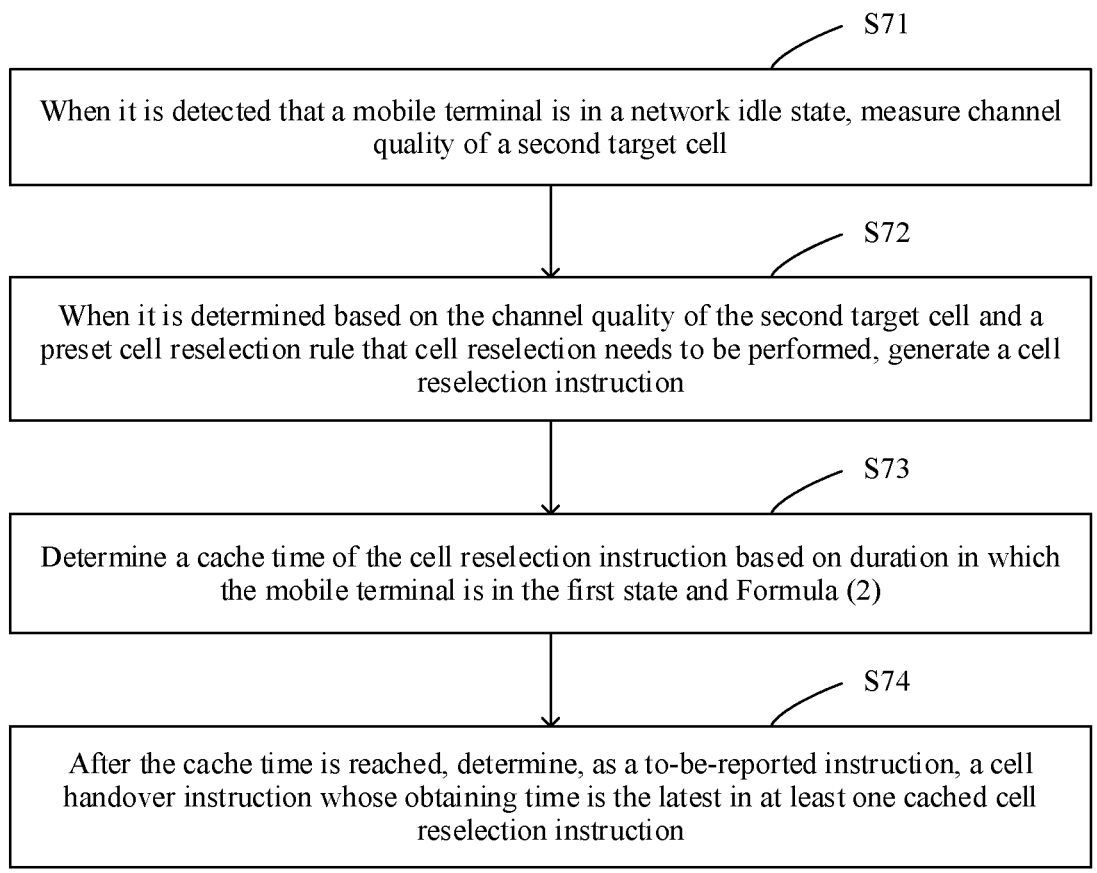
FIG. 10 is a schematic diagram of another work procedure of obtaining a to-be-reported instruction in an application processor wakeup method applied to a mobile terminal according to an embodiment of this application.

Alternatively, in another embodiment of this application, after the cell reselection instruction is obtained, the cell reselection instruction may be further cached. After the cell reselection instruction is cached for a period of time, the to-be-reported instruction is further determined based on the cached cell reselection instruction. In this case, with reference to a schematic diagram of a work procedure shown in FIG. 10, obtaining the to-be-reported instruction that needs to be reported to the application processor includes the following steps:

Step S71: When it is detected that the mobile terminal is in a network idle state, measure channel quality of a second target cell. The second target cell is a cell whose cell priority is not lower than a preset second priority threshold.

A specific operation process of step S71 may be the same as a specific operation process of step S61. Reference may be made between step S71 and step S61. Details are not described herein again.

Step S72: When it is determined based on the channel quality of the second target cell and a preset cell reselection rule that cell reselection needs to be performed, generate a cell reselection instruction.

Step S73: Determine a cache time of the cell reselection instruction based on a duration in which the mobile terminal is in the first state and the following formula:

$$T2(t0) = \begin{cases} T12; & t0 < T3 \\ t2*\beta + T12; & T3 \le t0 \le T4 \\ t2 + T12; & t0 > T4 \end{cases} \quad \text{Formula (2)}$$

Herein, T2(t0) represents the cache time of the cell reselection instruction, t0 represents the duration in which the mobile terminal is in the first state, T3, T4, T12, and t2 represent preset duration, and β is a preset constant, where a value of β is a positive number less than 1.

In this embodiment of this application, a correspondence between the duration in which the mobile terminal is in the first state and the cache time of the cell reselection instruction is preset. In this case, after the mobile terminal obtains the cell reselection instruction in step S72, the duration in which the mobile terminal is in the first state may be determined at a current moment, and the cache time of the cell reselection instruction may be determined based on the correspondence.

Step S74: After the cache time is reached, determine, as the to-be-reported instruction, a cell handover instruction whose obtaining time is the latest in at least one cached cell reselection instruction.

In a cache process, the mobile terminal may generate one or more cell reselection instructions. If the mobile terminal generates only one cell reselection instruction, the cell reselection instruction is a cell reselection instruction whose obtaining time is the latest, that is, the cell reselection instruction is the to-be-reported instruction. If a plurality of cell reselection instructions are received, the cell reselection instruction whose obtaining time is the latest is selected as the to-be-reported instruction.

In the prior art, after obtaining the cell reselection instruction, the mobile terminal immediately reports the cell reselection instruction to the application processor. However, in this embodiment of this application, after obtaining the cell reselection instruction, the mobile terminal caches the cell reselection instruction, and after the cache time is reached, uses, as the to-be-reported instruction, the cell reselection instruction whose obtaining time is the latest in all the cached cell reselection instructions. Therefore, in comparison with the prior art, a quantity of times of reporting cell reselection instructions can be reduced in the solution disclosed in this embodiment of this application, thereby reducing the quantity of times of waking up the application processor and avoiding frequent wakeups of the application processor.

Further, after the to-be-reported instruction is determined, another cached cell reselection instruction may be further deleted and be no longer cached, to save storage space.

The cache time of the cell reselection instruction is determined by using Formula (2). In Formula (2), β is a preset constant, and a value of β is usually a positive number less than 1. For example, β may be set to 0.7. In addition, T12 is an initial value of the cache time, and specific duration of T12 may be preset according to an actual application requirement. It can be learned from the formula that, if the duration in which the mobile terminal is in the first state is less than the preset duration T3, the corresponding cache time is T12. In this case, the cache time is equal to the initial value of the cache time. If the duration in which the mobile terminal is in the first state is not less than the preset duration T3 and is not greater than the preset duration T4, the corresponding cache time is t2*β+T12. If the duration in which the mobile terminal is in the first state is greater than the preset duration T4, the corresponding cache time is t2+T12.

It can be learned from the foregoing formula that, in this embodiment of this application, the longer duration in which the mobile terminal is in the first state indicates the longer cache time of the cell handover instruction.

In addition, when the mobile terminal is in the first state, in addition to a time update instruction, a cell handover instruction, and a cell reselection instruction, another type of instruction that needs to be reported to the application processor may be further obtained.

For example, sometimes, a network error occurs in the serving cell or a neighboring cell. In this case, an acknowledgment return instruction is frequently delivered to the mobile terminal. After receiving the acknowledgment return instruction, the application processor in the mobile terminal generates corresponding acknowledgment feedback information, and then transmits the acknowledgment feedback information to the serving cell or the neighboring cell. In addition, when the mobile terminal performs data transmission with the serving cell, the mobile terminal needs to set up a data link with the serving cell, to perform the data transmission by using the data link. However, in some cases, for example, due to a relatively weak network signal of the serving cell, setup of the data link fails, and the serving cell delivers a link setup failure instruction to the mobile terminal. In addition, after determining the serving cell, the mobile terminal usually needs to register with the serving cell. However, in some cases, a registration request of the mobile terminal cannot be transmitted to the serving cell, or registration acknowledgment information delivered by the serving cell cannot be transmitted to the mobile terminal, which causes a registration failure of the mobile terminal. In this case, the mobile terminal generates a network registration failure instruction. The acknowledgment return instruction, the link setup failure instruction, and the network registration failure instruction usually need to be reported to the application processor, so that the application processor performs corresponding operations. Certainly, there is also another type of instruction that needs to be reported to the application processor. This is not limited in this embodiment of this application.

In this case, in this embodiment of this application, it may be further set that the to-be-reported instruction is an instruction that is obtained for a quantity of times in a target time period that is greater than a preset quantity of times, thereby avoiding frequent wakeups of the application processor due to frequently obtaining of instructions.

If the quantity of obtaining times in the target time period is greater than the preset quantity of times, it indicates that the instruction is frequently obtained. In this case, the instruction may be used as the to-be-reported instruction, to avoid frequent wakeups of the application processor.

Further, in this embodiment of this application, after the to-be-reported instruction is obtained, whether the to-be-reported instruction needs to be reported further needs to be determined based on the third threshold. The third threshold may be obtained in a plurality of manners. In a manner, the third threshold may be preset to a fixed time value. In another manner, the third threshold may be further obtained based on the duration in which the mobile terminal is in the first state. In this case, after the to-be-reported instruction that needs to be reported to the application processor is obtained, the application processor wakeup method applied to a mobile terminal disclosed in this embodiment of this application further includes the following step:

Determine the third threshold based on the duration in which the mobile terminal is in the first state and the following formula:

$$T3(t0) = \begin{cases} T13; & t0 < T5 \\ t3*\delta + T13; & T5 \leq t0 \leq T6 \\ t3 + T13; & t0 > T6 \end{cases} \quad \text{Formula (3)}$$

Herein, T3(t0) represents the third threshold, t0 represents the duration in which the mobile terminal is in the first state, T5, T6, T13, and t3 represent preset duration, and δ is a preset constant, where a value of δ is a positive number less than 1.

In the foregoing formula, δ is a preset constant, and the value of δ is usually a positive number less than 1. For example, δ may be set to 0.7. In addition, T13 is an initial value of the third threshold, and specific duration of T13 may be preset according to an actual application requirement. It can be learned from the formula that, if the duration in which the mobile terminal is in the first state is less than the preset duration T5, the corresponding third threshold is T13. If the duration in which the mobile terminal is in the first state is not less than the preset duration T5 and is not greater than the preset duration T6, the corresponding third threshold is t3*δ+T13. If the duration in which the mobile terminal is in the first state is greater than the preset duration T6, the corresponding third threshold is t3+T13.

Figure 11:
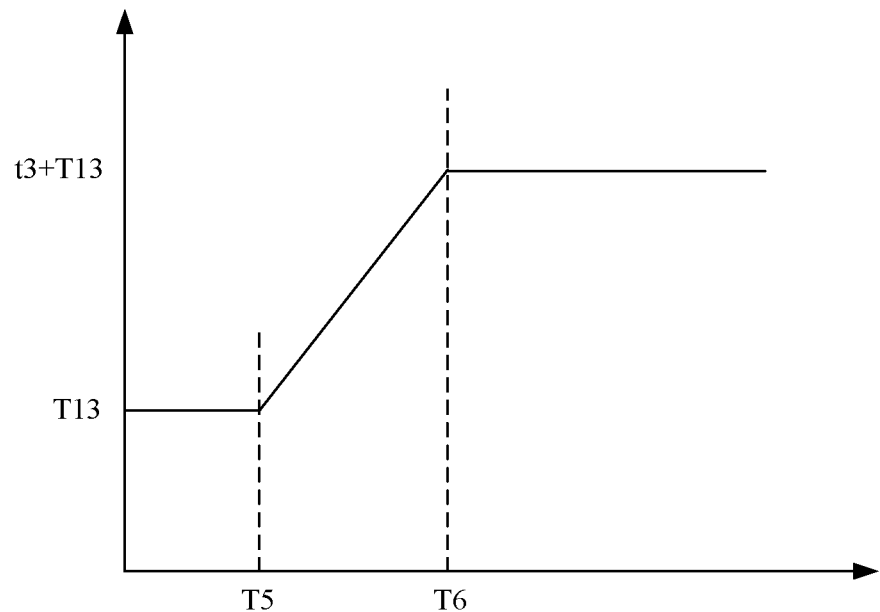
FIG. 11 is a schematic diagram of a correspondence between a third threshold and the duration in which a mobile terminal is in a first state in an application processor wakeup method applied to a mobile terminal according to an embodiment of this application.

FIG. 11 is a schematic diagram of a correspondence between the third threshold and the duration in which the mobile terminal is in the first state. It can be learned from the foregoing formula and FIG. 11 that, in this embodiment of this application, the longer duration in which the mobile terminal is in the first state indicates the greater third threshold and correspondingly a smaller quantity of times of reporting instructions to the application processor, thereby further reducing a quantity of times of waking up the application processor.

Further, in the application processor wakeup method applied to a mobile terminal disclosed in this embodiment of this application, reporting the to-be-reported instruction to the application processor includes:

when there are more than two to-be-reported instructions of a same type, comparing obtaining times of the to-be-reported instructions of the same type; and reporting, to the application processor, a to-be-reported instruction whose obtaining time is the latest in the to-be-reported instructions of the same type.

In the foregoing step, before the to-be-reported instructions are reported to the application processor, the to-be-reported instructions are divided based on types of the to-be-reported instructions. To-be-reported instructions of a same type are grouped into a same group. In this case, only a to-be-reported instruction that is latest obtained in to-be-reported instructions in each type needs to be reported to the application processor, thereby reducing a quantity of instructions to be reported to the application processor. In this case, after the application processor is woken up, the application processor needs to execute only the to-be-reported instruction that is latest obtained in each group of to-be-reported instructions, thereby reducing operations to be performed by the application processor.

Correspondingly, another embodiment of this application further discloses an application processor wakeup apparatus applied to a mobile terminal. With reference to a schematic structural diagram shown in FIG. 12, the application processor wakeup apparatus applied to a mobile terminal includes: a state detection module 110, an obtaining module 120, and an instruction reporting module 130.

The state detection module 110 is configured to detect whether a mobile terminal is in a preset first state. The first state is any one or more of the following states of the mobile terminal: a screen-off state, a non-charging state, or a state in which a speed of the mobile terminal is less than a preset first threshold and a serving cell handover speed is less than a preset second threshold.

The first state is any combination of one or more of the following states: the screen-off state, the non-charging state, or the state in which the speed is less than the preset first threshold and the serving cell handover speed is less than the preset second threshold. For example, in an implementation, it may be set that the mobile terminal is in the first state when the mobile terminal is in the screen-off state, the non-charging state, and the state in which the speed of the mobile terminal is less than the preset first threshold and the serving cell handover speed is less than the preset second threshold. The mobile terminal in this state indicates that the mobile terminal is not used by a user currently. In addition, because the mobile terminal is not charged, to reduce power consumption of the mobile terminal, the application processor does not need to be frequently woken up, and instead, the application processor is kept in a sleep state.

The obtaining module 120 is configured to: after it is determined that the mobile terminal is in the preset first state, obtain a to-be-reported instruction that needs to be reported to the application processor and a priority of the to-be-reported instruction.

In this embodiment of this application, corresponding priorities are preset for different types of to-be-reported instructions. In other words, a correspondence between each type of to-be-reported instruction and each priority is set. In this case, after the to-be-reported instruction is obtained, the priority of the to-be-reported instruction may be determined based on the type of the to-be-reported instruction. A priority corresponding to a to-be-reported instruction that urgently needs to be processed is usually relatively high, and a priority corresponding to a to-be-reported instruction that does not urgently need to be processed is usually relatively low.

The instruction reporting module 130 is configured to: when the priority of the to-be-reported instruction is higher than a preset priority, report the to-be-reported instruction to the application processor, to wake up the application processor.

In this embodiment of this application, if the obtained to-be-reported instruction includes the to-be-reported instruction whose priority is higher than the preset priority, it may be considered that a reporting condition is met, so that the to-be-reported instruction is reported to the application processor.

In the prior art, each time after the mobile terminal obtains the to-be-reported instruction, the mobile terminal immediately reports the to-be-reported instruction to the application processor. In this case, the application processor frequently obtains instructions. As a result, the application processor is frequently woken up. However, in the solution in this embodiment of this application, only when the to-be-reported instruction whose priority is higher than the preset priority is obtained, the to-be-reported instruction is reported to the application processor, to reduce a quantity of times of reporting instructions to the application processor and further reduce a quantity of times that the application processor obtains instructions, thereby avoiding frequent wakeups of the application processor. In this way, the prior-art problem is resolved.

Further, a quantity of times of waking up the application processor is reduced in this embodiment of this application. In comparison with the prior art, a time in which the application processor is in a sleep state is prolonged. Therefore, the runtime of the mobile terminal can be further prolonged.

In addition, in the application processor wakeup apparatus applied to a mobile terminal disclosed in this embodiment of this application, the instruction reporting module is further configured to: after the to-be-reported instruction that needs to be reported to the application processor and the priority of the to-be-reported instruction are obtained, if a difference between a current time and a time at which a to-be-reported instruction is reported to the application processor for a latest time is greater than a third threshold, report the to-be-reported instruction to the application processor, to wake up the application processor.

This embodiment of this application discloses an operation of obtaining the to-be-reported instruction. The to-be-reported instruction may be obtained in a plurality of manners based on the type of the to-be-reported instruction.

In a manner, the to-be-reported instruction is obtained based on a time update instruction. A serving cell of the mobile terminal usually transmits a time update instruction to the mobile terminal. A time is carried in the time update instruction, so that the mobile terminal updates a time of the mobile terminal based on the time. Generally, after network handover occurs on the mobile terminal, the serving cell transmits the time update instruction to the mobile terminal.

In this embodiment of this application, after receiving the time update instruction, the mobile terminal obtains a corresponding time reporting instruction based on the time update instruction, and uses the time reporting instruction as the to-be-reported instruction. In this case, the obtaining module includes:

an instruction receiving unit, configured to: receive at least one time update instruction, and record a receiving time of the time update instruction each time after the time update instruction is received;

a time difference obtaining unit, configured to: when the mobile terminal meets a preset trigger condition, obtain a time difference between a current time and a receiving time of a target time update instruction, where the target time update instruction is a time update instruction whose receiving time is closest to the current time, and when the mobile terminal is in a screen-on state and/or a charging state, the mobile terminal meets the preset trigger condition; and a time reporting instruction obtaining unit, configured to: obtain a sum of the time difference and a time included in the target time update instruction, and generate a time reporting instruction including the sum, where the time reporting instruction is the to-be-reported instruction.

In the prior art, each time after the mobile terminal receives the time update instruction, the mobile terminal reports the time update instruction to the application processor, to wake up the application processor. In this case, the application processor performs a time update operation. However, in the solution in this embodiment of this application, after obtaining the time update instruction, the mobile terminal caches the time update instruction instead of immediately reporting the time update instruction to the application processor. When the mobile terminal meets a preset trigger condition, the mobile terminal generates a corresponding time reporting instruction based on the latest received time update instruction, and uses the time reporting instruction as the to-be-reported instruction. Therefore, in comparison with the prior art, the quantity of times of reporting instructions to the application processor and a quantity of reported instructions are reduced in the solution disclosed in this embodiment of this application, to further reduce the quantity of times of waking up the application processor, thereby avoiding frequent wakeups of the application processor.

In addition, a corresponding to-be-reported instruction may be further obtained based on a cell handover instruction. In this case, the obtaining module in the application processor wakeup apparatus applied to a mobile terminal disclosed in this embodiment of this application includes:

a first measurement unit, configured to: after a measurement request delivered by a serving cell is received, measure channel quality of a first target cell, and report the channel quality of the first target cell to the serving cell, where the first target cell is a cell whose cell priority is not lower than a preset first priority threshold; and a first instruction obtaining unit, configured to obtain a cell handover instruction that is generated by the serving cell based on a preset cell handover rule and the channel quality of the first target cell, where the cell handover instruction is the to-be-reported instruction.

In the prior art, after receiving the measurement request delivered by the serving cell, the mobile terminal measures channel quality of each cell. However, in this embodiment of this application, only the channel quality of the cell whose cell priority is not lower than the preset first priority threshold is measured, thereby reducing a workload of the mobile terminal in measuring the channel quality and improving efficiency in measuring the channel quality.

In another embodiment of this application, after the cell handover instruction is obtained, the cell handover instruction may be further cached. After the cell handover instruction is cached for a period of time, the to-be-reported instruction is further determined based on the cached cell handover instruction. In this case, the obtaining module includes:

a second measurement unit, configured to: after a measurement request delivered by a serving cell is received, measure channel quality of a first target cell, and report the channel quality of the first target cell to the serving cell, where the first target cell is a cell whose cell priority is not lower than a preset first priority threshold;

a first instruction cache unit, configured to: obtain a cell handover instruction that is generated by the serving cell based on a preset cell handover rule and the channel quality of the first target cell, and cache the cell handover instruction;

a first cache time determining unit, configured to determine a cache time of the cell handover instruction based on the duration in which the mobile terminal is in the first state and the following formula:

$$T1(t0) = \begin{cases} T11; & t0 < T1 \\ t1*\alpha + T11; & T1 \le t0 \le T2, \\ t1 + T11; & t0 > T2 \end{cases}$$

where

T1 (t0) represents the cache time of the cell handover instruction, t0 represents the duration in which the mobile terminal is in the first state, T1, T2, T11, and t1 represent preset duration, and α is a preset constant, where a value of α is a positive number less than 1; and a first instruction determining unit, configured to: after the cache time is reached, determine, as the to-be-reported instruction, a cell handover instruction whose obtaining time is the latest in at least one cached cell handover instruction.

In the prior art, after receiving the cell handover instruction, the mobile terminal immediately reports the cell handover instruction to the application processor. However, in this embodiment of this application, after obtaining the cell handover instruction, the mobile terminal caches the cell handover instruction, and after the cache time, uses, as the to-be-reported instruction, the cell handover instruction whose obtaining time is the latest in all the cached cell handover instructions. Therefore, in comparison with the prior art, a quantity of times of reporting cell handover instructions can be reduced in the solution disclosed in this embodiment of this application, thereby reducing the quantity of times of waking up the application processor and avoiding frequent wakeups of the application processor.

In addition, the corresponding to-be-reported instruction may be further obtained based on a cell reselection instruction. In this case, the obtaining module includes:

a third measurement unit, configured to: when it is detected that the mobile terminal is in a network idle state, measure channel quality of a second target cell, where the second target cell is a cell whose cell priority is not lower than a preset second priority threshold; and a first instruction generating unit, configured to: when it is determined based on the channel quality of the second target cell and a preset cell reselection rule that cell reselection needs to be performed, generate a cell reselection instruction, where the cell reselection instruction is the to-be-reported instruction.

In the prior art, when it is detected that the mobile terminal is in the network idle state, channel quality of each cell is measured. However, in this embodiment of this application, only the channel quality of the cell whose cell priority is not lower than the preset second priority threshold is measured, thereby reducing a workload in measuring the channel quality and improving efficiency in measuring the channel quality.

Alternatively, in another embodiment of this application, after the cell reselection instruction is obtained, the cell reselection instruction may be further cached. After the cell reselection instruction is cached for a period of time, the to-be-reported instruction is further determined based on the cached cell reselection instruction. In this case, the obtaining module includes:

a fourth measurement unit, configured to: when it is detected that the mobile terminal is in a network idle state, measure channel quality of a second target cell, where the second target cell is a cell whose cell priority is not lower than a preset second priority threshold;

a second instruction generating unit, configured to: when it is determined based on the channel quality of the second target cell and a preset cell reselection rule that cell reselection needs to be performed, generate a cell reselection instruction;

a second cache time determining unit, configured to determine a cache time of the cell reselection instruction based on the duration in which the mobile terminal is in the first state and the following formula:

$$T2(t0) = \begin{cases} T12; & t0 < T3 \\ t2*\beta + T12; & T3 \le t0 \le T4, \\ t2 + T12; & t0 > T4 \end{cases}$$

where

T2(t0) represents the cache time of the cell reselection instruction, t0 represents the duration in which the mobile terminal is in the first state, T3, T4, T12, and t2 represent preset duration, and β is a preset constant, where a value of β is a positive number less than 1; and a second instruction determining unit, configured to: after the cache time is reached, determine, as the to-be-reported instruction, a cell handover instruction whose obtaining time is the latest in at least one cached cell reselection instruction.

In the prior art, after obtaining the cell reselection instruction, the mobile terminal immediately reports the cell reselection instruction to the application processor. However, in this embodiment of this application, after obtaining the cell reselection instruction, the mobile terminal caches the cell reselection instruction, and after the cache time is reached, uses, as the to-be-reported instruction, the cell reselection instruction whose obtaining time is the latest in all the cached cell reselection instructions. Therefore, in comparison with the prior art, a quantity of times of reporting cell reselection instructions can be reduced in the solution disclosed in this embodiment of this application, thereby reducing the quantity of times of waking up the application processor and avoiding frequent wakeups of the application processor.

In addition, when the mobile terminal is in the first state, in addition to a time update instruction, a cell handover instruction, and a cell reselection instruction, another type of instruction that needs to be reported to the application processor may be further obtained.

In this case, in this embodiment of this application, it may be further set that the to-be-reported instruction is an instruction that is obtained for a quantity of times in a target time period that is greater than a preset quantity of times. If the quantity of obtaining times in the target time period is greater than the preset quantity of times, it indicates that the instruction is frequently obtained. In this case, the instruction may be used as the to-be-reported instruction, to avoid frequent wakeups of the application processor. Further, in this embodiment of this application, after the to-be-reported instruction is obtained, whether the to-be-reported instruction needs to be reported further needs to be determined based on the third threshold. The third threshold may be obtained in a plurality of manners. In one manner, the third threshold may be preset to a fixed time value. In another manner, the third threshold may be further obtained based on the duration in which the mobile terminal is in the first state. In this case, in this embodiment of the present invention, the apparatus further includes:

a third threshold determining module.

The third threshold determining module is configured to: after the to-be-reported instruction that needs to be reported to the application processor is obtained, determine the third threshold based on the duration in which the mobile terminal is in the first state and the following formula:

$$T3(t0) = \begin{cases} T13; & t0 < T5 \\ t3*\delta + T13; & T5 \le t0 \le T6 \\ t3 + T13; & t0 > T6 \end{cases}$$

Herein, T3(t0) represents the third threshold, t0 represents the duration in which the mobile terminal is in the first state, T5, T6, T13, and t3 represent preset duration, and δ is a preset constant, where a value of δ is a positive number less than 1.

FIG. 11 is a schematic diagram of a correspondence between the third threshold and the duration in which the mobile terminal is in the first state. It can be learned from the foregoing formula and FIG. 11 that, in this embodiment of this application, the longer duration in which the mobile terminal is in the first state indicates the greater third threshold and correspondingly a smaller quantity of times of reporting instructions to the application processor, thereby further reducing a quantity of times of waking up the application processor.

Further, the instruction reporting module in the application processor wakeup apparatus applied to a mobile terminal disclosed in this embodiment of this application includes:

a time comparison unit, configured to: when there are more than two to-be-reported instructions of a same type, compare obtaining times of the to-be-reported instructions of the same type; and an instruction reporting unit, configured to report, to the application processor, a to-be-reported instruction whose obtaining time is the latest in the to-be-reported instructions of the same type.

In the foregoing solution, before the to-be-reported instructions are reported to the application processor, the to-be-reported instructions are divided based on types of the to-be-reported instructions. To-be-reported instructions of a same type are grouped into a same group. In this case, only a to-be-reported instruction that is latest obtained in to-be-reported instructions in each type needs to be reported to the application processor, thereby reducing a quantity of instructions to be reported to the application processor. In this case, after the application processor is woken up, the application processor needs to execute only the to-be-reported instruction that is latest obtained in each group of to-be-reported instructions, thereby reducing operations to be performed by the application processor.

Figure 13:
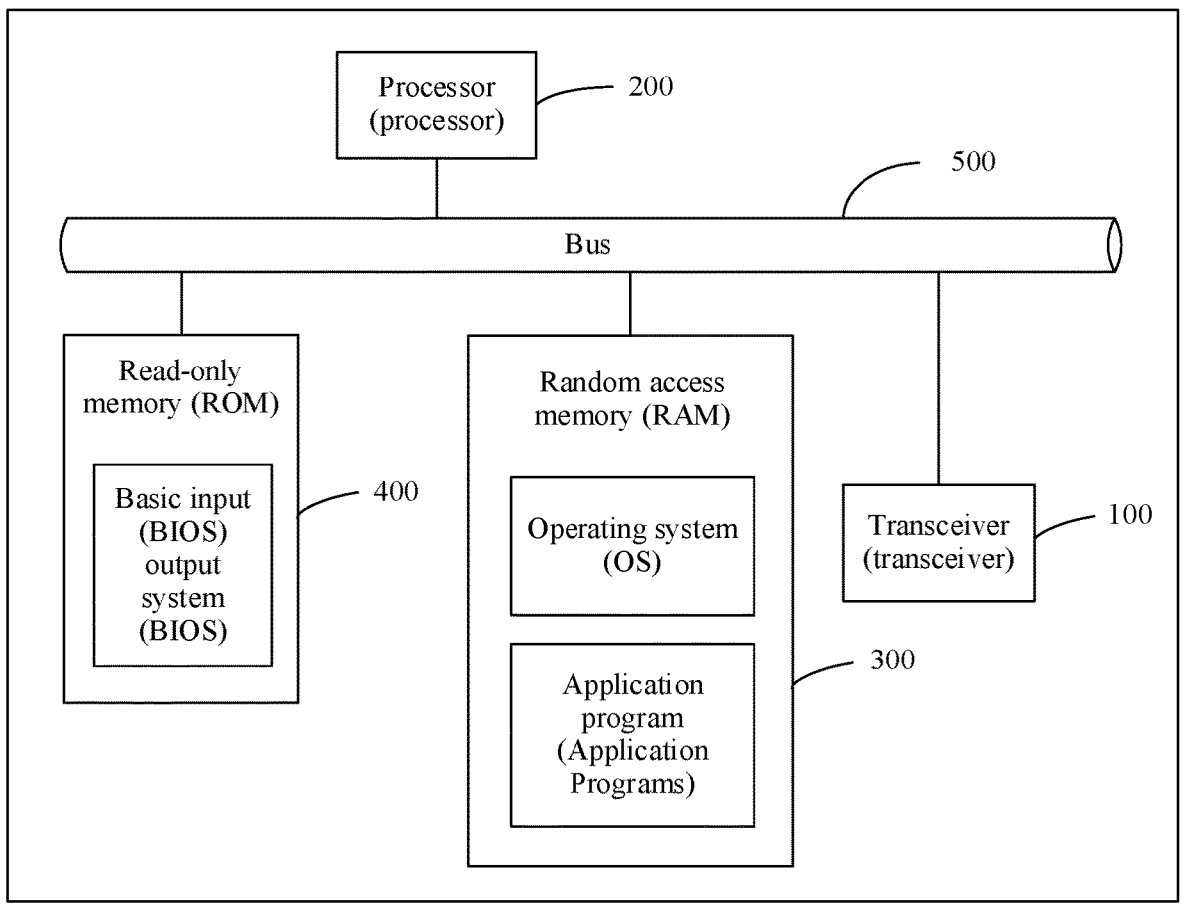
FIG. 13 is a schematic structural diagram of a mobile terminal according to an embodiment of this application.

Another embodiment of this application further discloses a mobile terminal. The mobile terminal may include a terminal device that can perform a communication service, for example, a mobile phone and a phone watch. With reference to a schematic structural diagram shown in FIG. 13, the mobile terminal includes a memory, a processor 200, and a computer program that is stored in the memory and that can be run on the processor. Further, the mobile terminal may further include a transceiver 100. The memory may include a random access memory 300, a read-only memory 400, and a bus 500. The processor 200 is separately coupled to the transceiver 100, the random access memory 300, and the read-only memory 400 by using the bus 500. When the processor executes the computer program, some or all steps of the application processor wakeup method applied to a mobile terminal disclosed in the foregoing embodiments of this application are implemented, that is, some or all steps of the application processor wakeup method applied to a mobile terminal shown in FIG. 1, FIG. 3, FIG. 4, FIG. 6, FIG. 7, FIG. 9, and FIG. 10 are implemented.

In addition, the processor 200 is another module that has a processing function in the mobile terminal other than an application processor, and the module can transmit an instruction to the application processor. For example, the processor 200 may be a modem connected to the application processor.

When the mobile terminal needs to be run, a basic input/output system solidified into the memory or a bootloader in an embedded system is used to boot the system to start, and boot the mobile terminal to enter a normal running state. After the mobile terminal enters the normal running state, the mobile terminal runs an application program and an operating system in the memory, so that the processor performs the following operations:

Detect whether the mobile terminal is in a preset first state. The first state is any one or more of the following states of the mobile terminal: a screen-off state, a non-charging state, or a state in which a speed of the mobile terminal is less than a preset first threshold and a serving cell handover speed is less than a preset second threshold.

After it is determined that the mobile terminal is in the preset first state, obtain a to-be-reported instruction that needs to be reported to the application processor and a priority of the to-be-reported instruction.

When the priority of the to-be-reported instruction is higher than a preset priority, report the to-be-reported instruction to the application processor, to wake up the application processor.

The mobile terminal in this embodiment of the present invention may correspond to the mobile terminal in the embodiments corresponding to FIG. 1, FIG. 3, FIG. 4, FIG. 6, FIG. 7, FIG. 9, and FIG. 10. The mobile terminal may implement functions and/or various implemented steps and methods of the mobile terminal in the embodiments corresponding to FIG. 1, FIG. 3, FIG. 4, FIG. 6, FIG. 7, FIG. 9, and FIG. 10. For brevity, details are not described herein again.

A storage medium in any device may be a magnetic disk, an optical disc, a read-only memory (ROM for short), a random access memory (RAM for short), or the like.

The processor is another module that has a processing function in the mobile terminal other than the application processor, and the module can transmit an instruction to the application processor. For example, the processor 200 may be a modem connected to the application processor. The processor may further include a hardware chip. The hardware chip may be an application-specific integrated circuit (ASIC), a programmable logic device (PLD), or a combination thereof. The PLD may be a complex programmable logic device (complex programmable logic device, CPLD), a field-programmable gate array (FPGA), a generic array logic (GAL), or any combination thereof. The memory may include a volatile memory, for example, a random access memory (RAM); the memory may also include a non-volatile memory, for example, a read-only memory (ROM), a flash memory, a hard disk drive (HDD), or a solid-state drive (SSD); or the memory may further include a combination of the foregoing types of memories.

It should be noted that, in this embodiment, a network device may be implemented based on a general purpose physical server in combination with a network functions virtualization (NFV) technology, and the network device is a virtual network device (for example, a virtual host, a virtual router, or a virtual switch). The virtual network device may be a virtual machine (VM). The virtual machine is hosted on a hardware device (for example, a physical server). The virtual machine indicates a complete computer system that is simulated by using software, that has functions of a complete hardware system, and that is run in a completely isolated environment. After reading this application, a person skilled in the art may virtualize a plurality of network devices with the foregoing functions on the general purpose physical server. Details are not described herein.

An embodiment of this application relates to a network selection method applied to a mobile terminal. The mobile terminal may include a terminal device that can perform a communication service, for example, a mobile phone and a phone watch.

Figure 14:
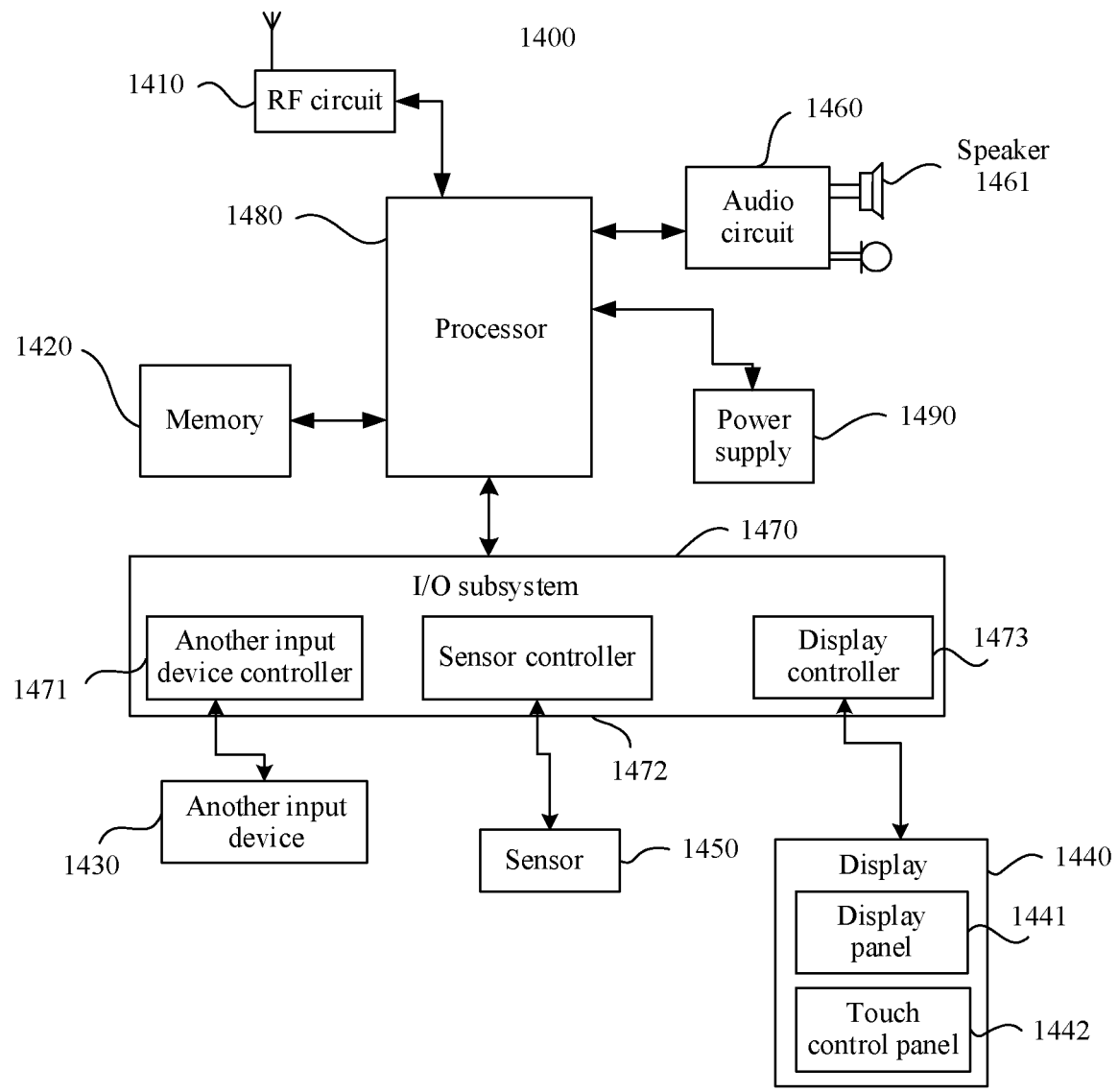
FIG. 14 is a schematic structural diagram of another mobile terminal according to an embodiment of this application.

An example in which the mobile terminal is a mobile phone is used. FIG. 14 is a block diagram of a partial structure of a mobile phone 1400 according to an embodiment of the present invention. With reference to FIG. 14, the mobile phone 1400 includes components such as an RF (radio frequency) circuit 1410, a memory 1420, another input device 1430, a display screen 1440, a sensor 1450, an audio circuit 1460, an I/O subsystem 1470, a processor 1480, and a power supply 1490. A person skilled in the art may understand that a structure of the mobile phone shown in FIG. 14 constitutes no limitation on the mobile phone, and the mobile phone may include more or fewer components than those shown in the figure, or may combine some components, or may split some components, or may have a different component arrangement. A person skilled in the art may understand that the display screen 1440 belongs to a user interface (UI), and the mobile phone 1400 may include more or fewer user interfaces than those shown in the figure.

The following describes all components of the mobile phone 1400 in detail with reference to FIG. 14.

The RF circuit 1410 may be configured to receive and send a signal in an information receiving/sending process or a call process. In particular, after receiving downlink information of a base station, the RF circuit 1410 sends the downlink information to the processor 1480 for processing, and in addition, sends related uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 1410 may further communicate with a network and another device through wireless communication. The wireless communication may use any communications standard or protocol, including but not limited to: a global system for mobile communications (GSM), a general packet radio service GPRS), code division multiple access (CDMA), wideband code division multiple access (WCDMA), long term evolution (LTE), an e-mail, a short message service (SMS), or the like.

The memory 1420 may be configured to store a software program and a module. The processor 1480 runs the software program and the module stored in the memory 120, to perform various functional applications and data processing of the mobile phone 1400. The memory 120 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone 1400, and the like. In addition, the memory 1420 may include a high-speed random access memory, and may further include a nonvolatile memory, for example, at least one magnetic disk storage device, a flash storage device, or another volatile solid-state storage device.

The other input device 1430 may be configured to: receive input digital or character information; and generate key signal input related to user settings and function control of the mobile phone 1400. Specifically, the other input device 1430 may include but is not limited to one or more of a physical keyboard, a function key (such as a volume control key or an on/off key), a trackball, a mouse, a joystick, an optical mouse (the optical mouse is a touch-sensitive surface that does not display visual output, an extension of a touch-sensitive surface formed by a touchscreen), or the like. The other input device 1430 is connected to another input device controller 1471 of the I/O subsystem 1470, and exchanges a signal with the processor 1480 under control of the other input device controller 1471.

Figure 12:
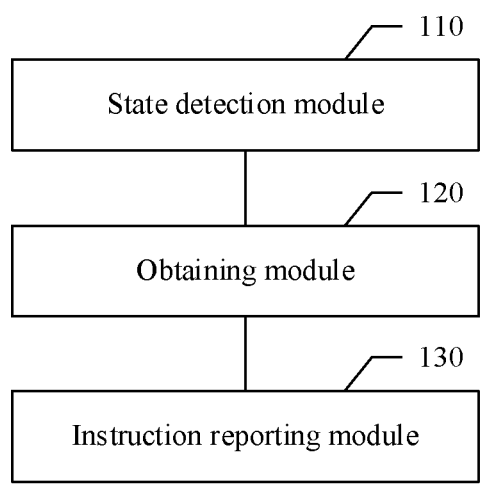
FIG. 12 is a schematic structural diagram of an application processor wakeup apparatus applied to a mobile terminal according to an embodiment of this application.

The display screen 1440 may be configured to display information entered by a user or information provided for a user, and various menus of the mobile phone 1400, and may further receive user input. Specifically, the display screen 1440 may include a display panel 1441 and a touch panel 1442. The display panel 1441 may be configured in a form of an LCD (liquid crystal display), an OLED (organic light-emitting diode), or the like. The touch panel 1442 is also referred to as a touchscreen, a touch-sensitive screen, or the like, and may collect a touch or non-touch operation (for example, an operation performed by the user on or near the touch panel 1442 by using any proper object or accessory, such as a finger or a stylus; or a motion sensing operation, where the operation includes a single-point control operation, a multipoint control operation, or a similar type of operation) performed by the user on or near the touch panel 1442, and drive a corresponding connection apparatus based on a preset program. Optionally, the touch panel 1442 may include two parts: a touch detection apparatus and a touch controller. The touch detection apparatus detects a touch orientation and gesture of the user, detects a signal brought by a touch operation, and transmits the signal to the touch controller. The touch controller receives touch information from the touch detection apparatus, converts the touch information into information that can be processed by the processor, and then sends the information to the processor 1480; and can receive and execute a command sent by the processor 1480. In addition, the touch panel 1442 may be implemented by using a plurality of types such as a resistive type, a capacitive type, an infrared ray, and a surface acoustic wave, or the touch panel 1442 may be implemented by using any technology developed in the future. Further, the touch panel 1442 may cover the display panel 1441. The user may perform, based on content displayed on the display panel 1441 (the displayed content includes but is not limited to a soft keyboard, a virtual mouse, a virtual key, an icon, and the like), an operation on or near the touch panel 1442 that covers the display panel 1441. After detecting the operation on or near the touch panel 1442, the touch panel 1442 transmits the operation to the processor 1480 by using the I/O subsystem 1470, to determine user input. Then, the processor 1480 provides corresponding visual output on the display panel 1441 based on the user input by using the I/O subsystem 1470. Although the touch panel 1442 and the display panel 1441 in FIG. 12 are used as two separate parts to implement input and input functions of the mobile phone 1400, in some embodiments, the touch panel 1442 and the display panel 1441 may be integrated to implement the input and output functions of the mobile phone 1400.

The mobile phone 1400 may further include the at least one sensor 1450, for example, an optical sensor, a motion sensor, and another sensor. Specifically, the optical sensor may include an ambient light sensor and a proximity sensor. The ambient light sensor may adjust luminance of the display panel 1441 based on brightness of ambient light. The proximity sensor may be used to power off the display panel 1441 and/or enter a backlight state when the mobile phone 1400 is moved to an ear. As a type of motion sensor, an accelerometer sensor may detect a value of an acceleration in each direction (generally, three axes), may detect a value and a direction of gravity in a static state, and may be used in an application for identifying a mobile phone posture (such as screen switching between a landscape mode and a portrait mode, a related game, or magnetometer posture calibration), a function related to vibration recognition (such as a pedometer or a knock), and the like. Other sensors such as a gyroscope, a barometer, a hygrometer, a thermometer, and an infrared sensor may also be included in the mobile phone 1400. Details are not described herein.

The audio circuit 1460, a speaker 1461, and a microphone 1462 may provide audio interfaces between the user and the mobile phone 1400. The audio circuit 1460 may convert received audio data into a signal and transmit the signal to the loudspeaker 1461, and the loudspeaker 1461 converts the signal into a sound signal and outputs the sound signal. In addition, the microphone 1462 converts a collected sound signal into a signal; and the audio circuit 1460 receives the signal, converts the signal into audio data, and outputs the audio data to the RF circuit 1408 to send the audio data to, for example, another mobile phone, or outputs the audio data to the memory 1420 for further processing.

The I/O subsystem 1470 is configured to control an external input/output device, and may include the other input device controller 1471, a sensor controller 1472, and a display controller 1473. Optionally, one or more other input control device controllers 1471 receive a signal from the other input device 1430 and/or send a signal to the other input device 1430. The other input device 1430 may include a physical button (such as a press button or a rocker button), a dial pad, a slider switch, a joystick, a click scroll wheel, and an optical mouse (the optical mouse is a touch-sensitive surface that displays no visual output, or an extension of a touch-sensitive surface formed by a touchscreen). It should be noted that the other input control device controller 1471 may be connected to any one or more of the foregoing devices. The display controller 1473 in the I/O subsystem 1470 receives a signal from the display screen 1440 and/or sends a signal to the display screen 1440. After the display screen 1440 detects user input, the display controller 1473 converts the detected user input into interaction with a user interface object displayed on the display screen 1440, to implement human-machine interaction. The sensor controller 1472 may receive a signal from one or more sensors 1450 and/or send a signal to one or more sensors 1450.

The processor 1480 is a control center of the mobile phone 1400, uses various interfaces and lines to connect all parts of the entire mobile phone, and executes various functions and processes data of the mobile phone 1400 by running or executing the software program and/or the module stored in the memory 1420 and invoking the data stored in the memory 1420, to perform overall monitoring on the mobile phone. Optionally, the processor 1480 may include one or more processing units. Preferably, an application processor and a modem processor may be integrated into the processor 1480. The application processor mainly processes an operating system, a user interface, an application program, and the like. The modem processor mainly processes wireless communication. It may be understood that the modem processor may alternatively not be integrated into the processor 1480. When the application processor and the modem processor are integrated into the processor 1480, the modem processor may implement functions in the embodiments corresponding to FIG. 1, FIG. 3, FIG. 4, FIG. 6, FIG. 7, FIG. 9, and FIG. 10 and/or perform steps and methods in the corresponding embodiments, and report an instruction to the application processor.

The mobile phone 1400 further includes the power supply 1490 (for example, a battery) that supplies power to each component. Preferably, the power supply may be logically connected to the processor 1480 by using a power management system, to implement functions such as charging management, discharging management, and power consumption management by using the power management system.

Although not shown, the mobile phone 1400 may further include a camera, a Bluetooth module, and the like. Details are not described herein.

In a specific implementation, an embodiment of this application further provides a computer readable medium. The computer readable medium includes an instruction. When the computer readable medium is run on a computer, the computer is enabled to implement some or all steps of the application processor wakeup method applied to a mobile terminal provided in FIG. 1, FIG. 3, FIG. 4, FIG. 6, FIG. 7, FIG. 9, and FIG. 10. A storage medium in any device may be a magnetic disk, an optical disc, a read-only memory (ROM for short), a random access memory (RAM for short), or the like.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information to the storage medium. Alternatively, the storage medium may further be integrated into the processor. The processor and the storage medium may be implemented in an ASIC, and the ASIC may be placed in UE. Optionally, the processor and the storage medium may be alternatively arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid state drive (Solid State Disk (SSD)), or the like.

The parts in this specification are all described in a progressive manner. For same or similar parts in the embodiments, refer to these embodiments. Each embodiment focuses on a difference from other embodiments. Particularly, apparatus and system embodiments are basically similar to a method embodiment, and therefore are described briefly. For related parts, refer to descriptions in the method embodiment.

Although some preferred embodiments of this application have been described, a person skilled in the art can make changes and modifications to these embodiments once the person skilled in the art learns the basic inventive concept. Therefore, the appended claims are intended to be construed as to cover the preferred embodiments and all changes and modifications falling within the scope of this application.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

For same or similar parts of the embodiments in this specification, refer to these embodiments. Particularly, the apparatus embodiment is basically similar to the method embodiment, and therefore is described briefly. For related parts, refer to descriptions in the method embodiment.

The foregoing described implementations of the present invention are not intended to limit the protection scope of the present invention.

What is claimed is:

1. An application processor wakeup method applied to a mobile terminal, comprising:
   detecting whether the mobile terminal is in a preset first state, wherein the first state is one or more of the following states of the mobile terminal: a screen-off state, a non-charging state, or a state in which a speed of the mobile terminal is less than a preset first threshold and a serving cell handover speed is less than a preset second threshold;
   after it is determined that the mobile terminal is in the preset first state, obtaining a to-be-reported instruction that needs to be reported to an application processor and a priority of the to-be-reported instruction; and
   when the priority of the to-be-reported instruction is higher than a preset priority and a difference between a current time and a latest time at which a to-be-reported instruction is reported to the application processor is greater than a third threshold, reporting the to-be-reported instruction to the application processor, to wake up the application processor.

2. The application processor wakeup method applied to a mobile terminal according to claim 1, wherein the obtaining a to-be-reported instruction that needs to be reported to an application processor comprises:
   receiving at least one time update instruction, and recording a receiving time of the time update instruction each time after the time update instruction is received;
   when the mobile terminal meets a preset trigger condition, obtaining a time difference between a current time and a receiving time of a target time update instruction, wherein the target time update instruction is a time update instruction whose receiving time is closest to the current time, and when the mobile terminal is in a screen-on state and/or a charging state, the mobile terminal meets the preset trigger condition; and
   obtaining a sum of the time difference and a time comprised in the target time update instruction, and generating a time reporting instruction comprising the sum, wherein the time reporting instruction is the to-be-reported instruction.

3. The application processor wakeup method applied to a mobile terminal according to claim 1, wherein the obtaining a to-be-reported instruction that needs to be reported to an application processor comprises:

after a measurement request delivered by a serving cell is received, measuring channel quality of a first target cell, and reporting the channel quality of the first target cell to the serving cell, wherein the first target cell is a cell whose cell priority is not lower than a preset first priority threshold; and obtaining a cell handover instruction that is generated by the serving cell based on a preset cell handover rule and the channel quality of the first target cell, wherein the cell handover instruction is the to-be-reported instruction.

4. The application processor wakeup method applied to a mobile terminal according to claim 1, wherein the obtaining a to-be-reported instruction that needs to be reported to an application processor comprises:

after a measurement request delivered by a serving cell is received, measuring channel quality of a first target cell, and reporting the channel quality of the first target cell to the serving cell, wherein the first target cell is a cell whose cell priority is not lower than a preset first priority threshold;

obtaining a cell handover instruction that is generated by the serving cell based on a preset cell handover rule and the channel quality of the first target cell, and caching the cell handover instruction;

determining a cache time of the cell handover instruction based on a duration in which the mobile terminal is in the first state and the following formula:

$$T1(t0) = \begin{cases} T11; & t0 < T1 \\ t1 * \alpha + T11; & T1 \le t0 \le T2 \\ t1 + T11; & t0 > T2 \end{cases}$$

wherein

T1(t0) represents the cache time of the cell handover instruction, t0 represents the duration in which the mobile terminal is in the first state, T1, T2, T11, and t1 represent preset durations, and α is a preset constant, wherein a value of α is a positive number less than 1; and after the cache time is reached, determining, as the to-be-reported instruction, a cell handover instruction whose obtaining time is the latest in at least one cached cell handover instruction.

5. The application processor wakeup method applied to a mobile terminal according to claim 1, wherein the obtaining a to-be-reported instruction that needs to be reported to an application processor comprises:

when it is detected that the mobile terminal is in a network idle state, measuring channel quality of a first target cell, wherein the first target cell is a cell whose cell priority is not lower than a preset second priority threshold; and when it is determined based on the channel quality of the first target cell and a preset cell reselection rule that cell reselection needs to be performed, generating a cell reselection instruction, wherein the cell reselection instruction is the to-be-reported instruction.

6. The application processor wakeup method applied to a mobile terminal according to claim 1, wherein the obtaining a to-be-reported instruction that needs to be reported to an application processor comprises:

when it is detected that the mobile terminal is in a network idle state, measuring channel quality of a first target cell, wherein the first target cell is a cell whose cell priority is not lower than a preset second priority threshold;

when it is determined based on the channel quality of the first target cell and a preset cell reselection rule that cell reselection needs to be performed, generating a cell reselection instruction;

determining a cache time of the cell reselection instruction based on a duration in which the mobile terminal is in the first state and the following formula:

$$T2(t0) = \begin{cases} T12; & t0 < T3 \\ t2 * \beta + T12; & T3 \le t0 \le T4 \\ t2 + T12; & t0 > T4 \end{cases}$$

wherein

T2(t0) represents the cache time of the cell reselection instruction, t0 represents the duration in which the mobile terminal is in the first state, T3, T4, T12, and t2 represent preset durations, and β is a preset constant, wherein a value of β is a positive number less than 1; and after the cache time is reached, determining, as the to-be-reported instruction, a cell handover instruction whose obtaining time is the latest in at least one cached cell reselection instruction.

7. The application processor wakeup method applied to a mobile terminal according to claim 1, wherein the to-be-reported instruction is an instruction that is obtained for a quantity of times in a target time period that is greater than a preset quantity of times.

8. The application processor wakeup method applied to a mobile terminal according to claim 1, wherein after the obtaining a to-be-reported instruction that needs to be reported to an application processor, the method further comprises:

determining the third threshold based on the duration in which the mobile terminal is in the first state and the following formula:

$$T3(t0) = \begin{cases} T13; & t0 < T5 \\ t3 * \delta + T13; & T5 \le t0 \le T6 \\ t3 + T13; & t0 > T6 \end{cases}$$

wherein

T3(t0) represents the third threshold, t0 represents the duration in which the mobile terminal is in the first state, T5, T6, T13, and t3 represent preset durations, and δ is a preset constant, wherein a value of δ is a positive number less than 1.

9. The application processor wakeup method applied to a mobile terminal according to claim 1 wherein the reporting the to-be-reported instruction to the application processor comprises:

when there are more than two to-be-reported instructions of a same type, comparing obtaining times of the to-be-reported instructions of the same type; and reporting, to the application processor, a to-be-reported instruction whose obtaining time is the latest in the to-be-reported instructions of the same type.

10. A mobile terminal, comprising:

at least one processor; and a memory coupled to the at least one processor, wherein the memory comprises instructions that, when executed by the at least one processor, cause the terminal to perform operations comprising:

detecting whether the mobile terminal is in a preset first state, wherein the first state is one or more of the following states of the mobile terminal: a screen-off state, a non-charging state, or a state in which a speed of the mobile terminal is less than a preset first threshold and a serving cell handover speed is less than a preset second threshold;

after it is determined that the mobile terminal is in the preset first state, obtaining a to-be-reported instruction that needs to be reported to an application processor and a priority of the to-be-reported instruction; and when the priority of the to-be-reported instruction is higher than a preset priority and if a difference between a current time and a latest time at which a to-be-reported instruction is reported to the application processor is greater than a third threshold, reporting the to-be-reported instruction to the application processor, to wake up the application processor.

11. The mobile terminal according to claim 10, wherein the obtaining a to-be-reported instruction that needs to be reported to an application processor comprises:

receiving at least one time update instruction, and recording a receiving time of the time update instruction each time after the time update instruction is received;

when the mobile terminal meets a preset trigger condition, obtaining a time difference between a current time and a receiving time of a target time update instruction, wherein the target time update instruction is a time update instruction whose receiving time is closest to the current time, and when the mobile terminal is in a screen-on state and/or a charging state, the mobile terminal meets the preset trigger condition; and obtaining a sum of the time difference and a time comprised in the target time update instruction, and generating a time reporting instruction comprising the sum, wherein the time reporting instruction is the to-be-reported instruction.

12. The mobile terminal according to claim 10, wherein the obtaining a to-be-reported instruction that needs to be reported to an application processor comprises:

after a measurement request delivered by a serving cell is received, measuring channel quality of a first target cell, and reporting the channel quality of the first target cell to the serving cell, wherein the first target cell is a cell whose cell priority is not lower than a preset first priority threshold; and obtaining a cell handover instruction that is generated by the serving cell based on a preset cell handover rule and the channel quality of the first target cell, wherein the cell handover instruction is the to-be-reported instruction.

13. The mobile terminal according to claim 10, wherein the obtaining a to-be-reported instruction that needs to be reported to an application processor comprises:

after a measurement request delivered by a serving cell is received, measuring channel quality of a first target cell, and reporting the channel quality of the first target cell to the serving cell, wherein the first target cell is a cell whose cell priority is not lower than a preset first priority threshold;

obtaining a cell handover instruction that is generated by the serving cell based on a preset cell handover rule and the channel quality of the first target cell, and caching the cell handover instruction;

determining a cache time of the cell handover instruction based on a duration in which the mobile terminal is in the first state and the following formula:

$$T1(t0) = \begin{cases} T11; & t0 < T1 \\ t1*\alpha + T11; & T1 \le t0 \le T2, \\ t1 + T11; & t0 > T2 \end{cases}$$

wherein

T1(t0) represents the cache time of the cell handover instruction, t0 represents the duration in which the mobile terminal is in the first state, T1, T2, T11, and t1 represent preset durations, and $\alpha$ is a preset constant, wherein a value of $\alpha$ is a positive number less than 1; and after the cache time is reached, determining, as the to-be-reported instruction, a cell handover instruction whose obtaining time is the latest in at least one cached cell handover instruction.

14. The mobile terminal according to claim 10, wherein the obtaining a to-be-reported instruction that needs to be reported to an application processor comprises:

when it is detected that the mobile terminal is in a network idle state, measuring a channel quality of a first target cell, wherein the first target cell is a cell whose cell priority is not lower than a preset second priority threshold; and when it is determined based on the channel quality of the first target cell and a preset cell reselection rule that cell reselection needs to be performed, generating a cell reselection instruction, wherein the cell reselection instruction is the to-be-reported instruction.

15. The mobile terminal according to claim 10, wherein the obtaining a to-be-reported instruction that needs to be reported to an application processor comprises:

when it is detected that the mobile terminal is in a network idle state, measuring channel quality of a first target cell, wherein the first target cell is a cell whose cell priority is not lower than a preset second priority threshold;

when it is determined based on the channel quality of the first target cell and a preset cell reselection rule that cell reselection needs to be performed, generating a cell reselection instruction;

determining a cache time of the cell reselection instruction based on a duration in which the mobile terminal is in the first state and the following formula:

$$T2(t0) = \begin{cases} T12; & t0 < T3 \\ t2*\beta + T12; & T3 \le t0 \le T4, \\ t2 + T12; & t0 > T4 \end{cases}$$

wherein

T2(t0) represents the cache time of the cell reselection instruction, t0 represents the duration in which the mobile terminal is in the first state, T3, T4, T12, and t2 represent preset durations, and $\beta$ is a preset constant, wherein a value of $\beta$ is a positive number less than 1; and after the cache time is reached, determining, as the to-be-reported instruction, a cell handover instruction whose obtaining time is the latest in at least one cached cell reselection instruction.

16. The mobile terminal according to claim 10, wherein the to-be-reported instruction is an instruction that is obtained for a quantity of times in a target time period that is greater than a preset quantity of times.

17. The mobile terminal according to claim 10, wherein the operations further comprise:
determining the third threshold based on the duration in which the mobile terminal is in the first state and the following formula:

$$T3(t0) = \begin{cases} T13; & t0 < T5 \\ t3*\delta + T13; & T5 \le t0 \le T6, \\ t3 + T13; & t0 > T6 \end{cases}$$

wherein
T3(t0) represents the third threshold, t0 represents the duration in which the mobile terminal is in the first state, T5, T6, T13, and t3 represent preset durations, and $\delta$ is a preset constant, wherein a value of $\delta$ is a positive number less than 1.

18. A non-transitory computer-readable medium having processor-executable instructions stored thereon, wherein the processor-executable instructions, when executed by a processor, cause the processor to perform:

detecting whether a mobile terminal is in a preset first state, wherein the first state is one or more of the following states of the mobile terminal: a screen-off state, a non-charging state, or a state in which a speed of the mobile terminal is less than a preset first threshold and a serving cell handover speed is less than a preset second threshold;

after it is determined that the mobile terminal is in the preset first state, obtaining a to-be-reported instruction that needs to be reported to an application processor and a priority of the to-be-reported instruction; and when the priority of the to-be-reported instruction is higher than a preset priority and if a difference between a current time and a latest time at which a to-be-reported instruction is reported to the application processor is greater than a third threshold, reporting the to-be-reported instruction to the application processor, to wake up the application processor.

* * * * *